United States Patent [19]

Ogura

[11] Patent Number: 5,142,376
[45] Date of Patent: Aug. 25, 1992

[54] IMAGE SIGNAL RECORDING AND REPRODUCING SYSTEM WITH PILOT SIGNAL PHASE-LOCKED WITH A SYNCHRONIZING SIGNAL

[75] Inventor: Tokihiko Ogura, Kanagawa, Japan

[73] Assignee: Canon Kabushiki Kaisha, Tokyo, Japan

[21] Appl. No.: 450,393

[22] Filed: Dec. 14, 1989

[30] Foreign Application Priority Data

Dec. 16, 1988 [JP] Japan .................................. 63-317693
Dec. 30, 1988 [JP] Japan .................................. 63-334851
Dec. 30, 1988 [JP] Japan .................................. 63-334853

[51] Int. Cl.[5] .......................... H04N 9/81; H04N 9/89
[52] U.S. Cl. ..................................... 358/310; 358/327
[58] Field of Search ............... 358/310, 316, 317, 318, 358/320, 330, 319, 337, 342, 906, 909, 327

[56] References Cited

U.S. PATENT DOCUMENTS 4,672,470 6/1987 Morimoto et al. .................. 358/334
4,823,196 4/1989 Goodard ............................. 358/342

Primary Examiner—Roy N. Envall, Jr.
Assistant Examiner—Huy Nguyen
Attorney, Agent, or Firm—Robin, Blecker, Daley & Driscoll

[57] ABSTRACT

An image signal recording and reproducing system is arranged to record on a recording medium an image signal composed of a chrominance signal and a luminance signal which includes a synchronizing signal in the following manner: The luminance signal is modulated into a first frequency band. The chrominance signal is modulated into a second frequency band. A pilot signal is formed in such a way as to have a frequency between the first and a second frequency bands and to be phase-locked to the syncrhonizing signal included in the luminance signal. A signal obtained by frequency-multiplexing the modulated luminance signal, the modulated chrominance signal and the pilot signal is recorded on the recording medium. In reproducing the recorded signal, time-base variations occurred during the process of reproduction in the reproduced luminance and chrominance signals are corrected by using the reproduced pilot signals. The arrangement prevents the deterioration of the image signal to enable the system to reproduce an image with a high picture quality.

12 Claims, 11 Drawing Sheets

FIG.1
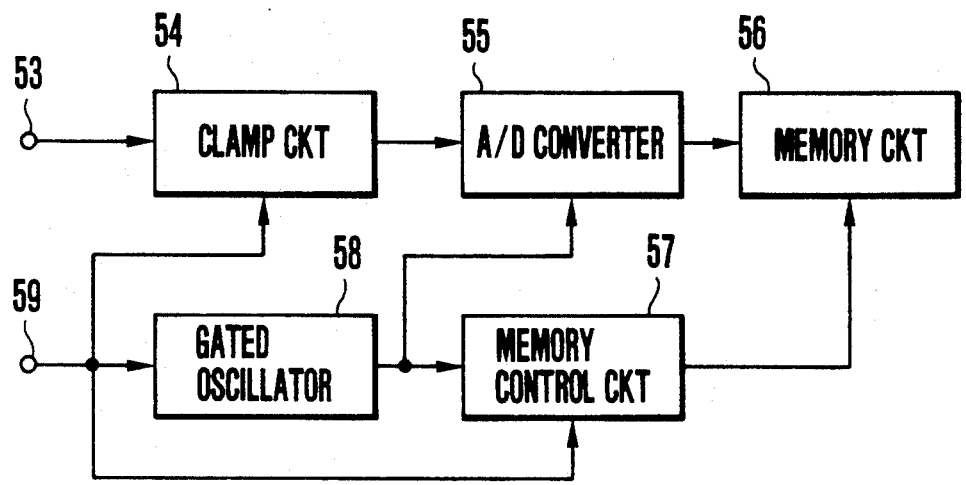
FIG.2(a)
FIG.2(b)
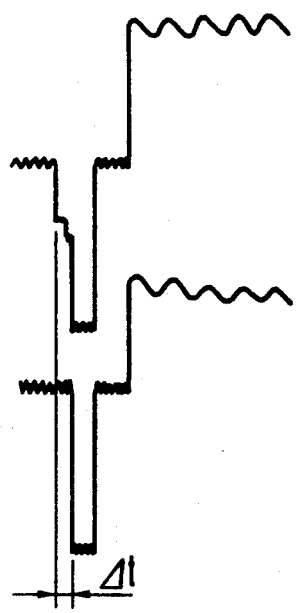

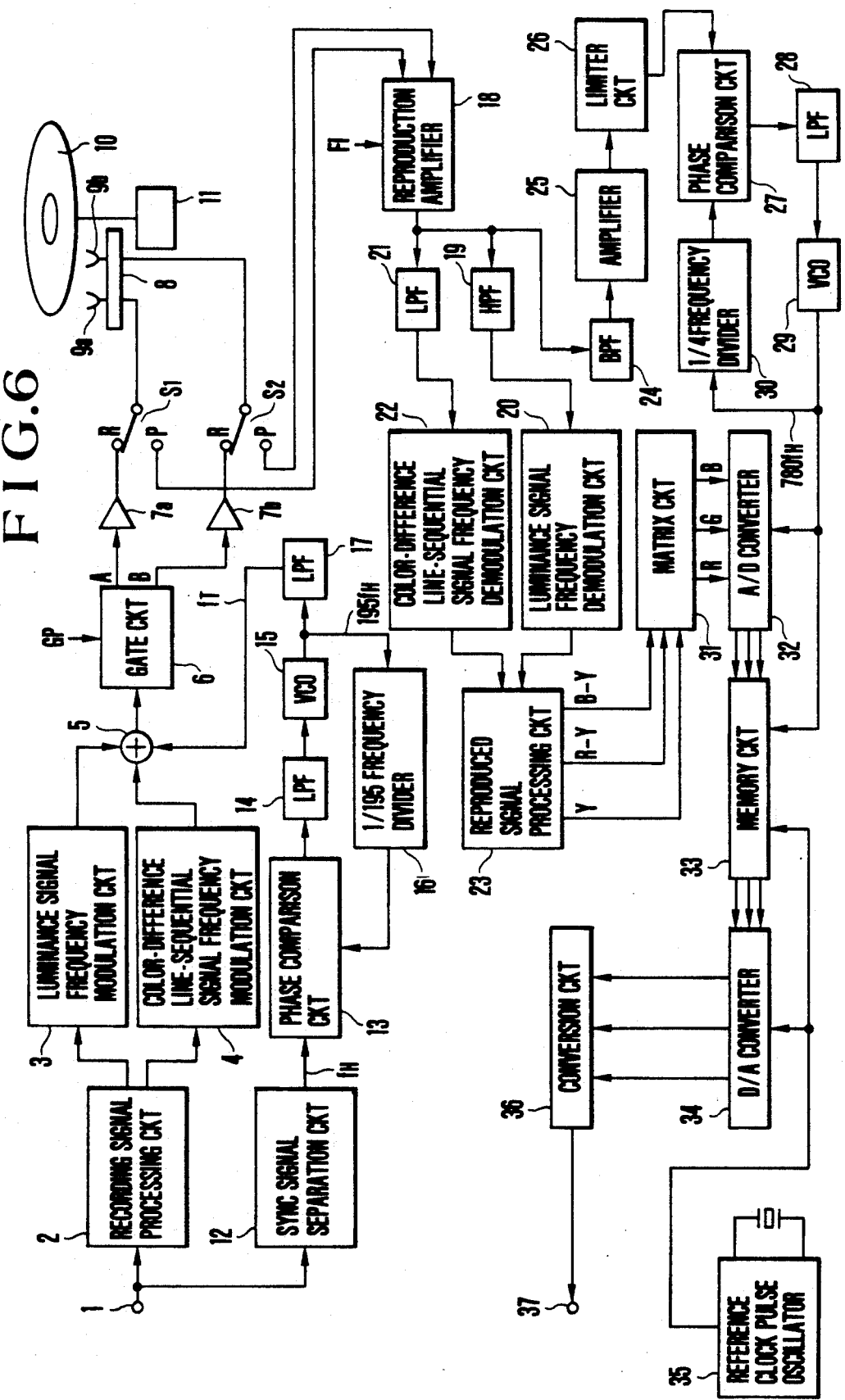

ated by the sync signal separation circuit and the sampling clock signal generated by the gated oscillator 58, the memory control circuit 57 applies a control signal to the memory circuit 56 for every horizontal period. This causes the signal R supplied to the memory circuit 56 to be stored at a desired address on the memory circuit 56 for every horizontal period.

IMAGE SIGNAL RECORDING AND REPRODUCING SYSTEM WITH PILOT SIGNAL PHASE-LOCKED WITH A SYNCHRONIZING SIGNAL

BACKGROUND OF THE INVENTION

1. Field of the Invention

This invention relates to an image signal recording and reproducing system which records an image signal on a recording medium and reproduces the recorded signal from the recording medium.

2. Description of the Related Art

Among known image signal recording and reproducing systems, a system called a still video system has been arranged, for example, to record a still image signal on a recording medium such as a magnetic disc and to reproduce the recorded still image signal from the medium.

Other image signal recording and reproducing systems such as video tape recorders and the like are now tending to become capable of giving a higher picture quality. In the case of the still video system, the picture quality of the still image signal has come to be recorded and reproduced with a higher degree of picture quality by changing the conventional recording format to a so-called high-band recording format. In accordance with the conventional format, a luminance signal which includes a synchronizing (hereinafter referred to as sync) signal has been recorded after frequency modulating it to have its sync tip part at 6 MHz and a white peak at 7.5 MHz. Whereas, in the high-band format, the sync tip part is set at 7.7 MHz and the white peak at 9.7 MHz to broaden the frequency modulating deviation range from 1.5 MHz to 2 MHz.

In addition to the function of reproducing the recorded still image signal from the magnetic disc and displaying it on a monitor device, the still video system has another function, which is as follows: The reproduced still image signal is digitized. The digitized signal is first stored in a memory. After that, the stored signal is read out to be transmitted to a remote place through a telephone line or the like or to be reproduced in the form of a hard copy by means of a printer.

FIG. 1 of the accompanying drawings shows in outline the arrangement of the conventional device for storing in a memory the still image signal reproduced from the magnetic disc. Referring to FIG. 1, the still image signal reproduced from the magnetic disc which is not shown is supplied to a sync signal separation circuit which is not shown. The sync signal separation circuit then separates from the still image signal a composite sync signal which consists of a horizontal sync signal and a vertical sync signal. After that, the still image signal is converted into three primary color signals R, G and B by an image signal processing circuit which is also not shown. One of the three primary color signals, say, the signal R is supplied from an input terminal 53 to a clamp circuit 54. The clamp circuit 54 performs a clamping process on the signal R. After the clamp circuit 54, the signal R is supplied to an analog-to-digital (hereinafter referred to as A/D) converter 55.

Meanwhile, the composite sync signal separated by the sync signal separation circuit is supplied via an input terminal 59 to a gated oscillator 58. The gated oscillator 58 then generates a sampling clock signal in synchronism with the horizontal sync signal included in the composite sync signal. In accordance with the sampling clock signal generated by the gated oscillator 58, the A/D converter 55 digitizes the signal R supplied from the clamp circuit 54 and supplies it to a memory circuit 56.

A memory control circuit 57 is arranged to control the writing and reading actions of the memory circuit 56. In accordance with the composite sync signal separated by the sync signal separation circuit and the sampling clock signal generated by the gated oscillator 58, the memory control circuit 57 applies a control signal to the memory circuit 56 for every horizontal period. This causes the signal R supplied to the memory circuit 56 to be stored at a desired address on the memory circuit 56 for every horizontal period.

While the high-band recording format enables the conventional still video system to enhance the degree of resolution of a reproduced still image by broadening the recording frequency band of the luminance signal, the reproduced still image is apt to be affected by a jitter component resulting from uneven rotation, a deformation or an eccentric state of the magnetic disc. This has caused the picture quality deterioration of the reproduced still image to be manifest to the visual sensations.

Further, in the conventional still video system, the edge part of the horizontal sync signal has sometimes been distorted by the frequency modulation and demodulation processes performed for recording and reproduction as shown in FIG. 2(a). In that event, the waveform of the horizontal sync signal separated by the sync signal separation circuit becomes as shown in FIG. 2(b). The waveform distortion in the edge part of the horizontal sync signal causes a deviation of the time base of the horizontal sync signal to an extent as shown by Δt in FIG. 2(b).

In the event of occurrence of the above-stated time base deviation in the edge part of the horizontal sync signal, the picture quality deteriorates, because: The device shown in FIG. 1 is arranged to have the sampling clock signal generated by the gated oscillator, 58 on the basis of, for example, the falling edge of the horizontal sync signal included in the composite sync signal supplied; to A/D convert the signal output from the clamp circuit 54 in synchronism with the sampling clock signal thus generated; and to store the A/D converted signal in the memory circuit 56. In this case, there arises a discrepancy in time among the sampling points obtained at the A/D converter 55 for every horizontal scanning line. Further, since the horizontal address deviates for every horizontal scanning line when the signal is stored at the memory circuit 56, a still image signal which is read out from the memory circuit 56 and converted into an analog signal by a digital-to-analog (D/A) converter (not shown) comes to show some discrepancy in the vertical edge part of the image.

Further, in the still video system, the resolution of the still image recorded is determined almost solely by the number of picture elements of an image sensor (such as a CCD image sensor) which is used for forming the still image signal. More specifically, the horizontal resolution is determined by the number of picture elements in the horizontal direction of the image sensor and the vertical resolution by the number of scanning lines of the current NTSC system.

To enhance the resolution of the still image, therefore, a still video camera has been arranged to use two image sensors each of which has 500 (vertical)×1,200 (horizontal) picture elements (hereinafter referred to as first and second image sensors). The first and second image sensors are arranged on the image sensing plane of the photo-taking optical system of the still video camera in such a way as to have the position of each picture element of one of the first and second image sensors deviate to an extent corresponding to ½ picture element from that of the other in the vertical direction, as shown in FIG. 3. The image is sampled by reading out the signal stored by picture elements indicated by a mark "o" in FIG. 3. Image signals output from the first and second image sensors are thus formed by sampling the signals output from picture elements which are disposed in every other picture element position in the horizontal direction. In addition to that, the sampling points of the first image sensor deviate from those of the second image sensor in the horizontal direction to an extent corresponding to one picture element. The image signals output respectively from the first and second image sensors are recorded in four tracks on a video floppy disc by means of two heads. The recording performed on the video floppy disc in this manner results in a recording pattern as shown in FIG. 4. Referring to FIG. 4, an image signal which corresponds to an odd-number field period and which has been output from the first image sensor is recorded in a track A. An image signal which corresponds to an odd-number field period and which has been output from the second image sensor is recorded in a track B. An image signal which corresponds to an even-number field and which has been output from the first image sensor is recorded in a track C. An image signal which corresponds to an even-number field and which has been output from the second image sensor is recorded in a track D.

In reproducing the record, reproduced image signals obtained from the four tracks of the video floppy disc are composed into an image at an image memory. Then, on the image memory, an interpolation process is carried out to obtain a still image signal of approximately 1,200 (horizontal)×1,000 (vertical) picture elements. This image signal is then supplied to a video printer or a high-definition TV monitor.

The image signal which output from the image sensor is thinned out as mentioned in the foregoing. After that, the image signal is recorded on a video floppy disc. The recorded image signal is reproduced from the video floppy disc and is then stored in the image memory to be recomposed into a still image. The recomposition of the still image is carried out by a sort of analog transmission of sampled values. The analog transmission requires strict control over the overall amplitude and phase characteristics of a transmission route consisting of a magnetic recording-reproducing system, frequency demodulation system, etc.

Further, in order that the reproduced signal is performed at timing accurately corresponding to the positions of sampling points shown in FIG. 3, it is necessary to use a time base variation correcting circuit for accurately correcting time base variations taking place in the recording-reproducing system. For this purpose, the following method is conceivable: In recording, a pilot signal for correcting time base variations is recorded by frequency multiplexing between a frequency-modulated color-difference signal band and a frequency-modulated luminance signal band as shown in FIG. 5. Then, in reproducing, the time base variations are corrected by forming a clock signal having the same jitter component as the reproduced pilot signal by means of a PLL circuit and by using this clock signal for writing into the above-stated image memory.

Meanwhile, the S/N ratio of reproduction becomes better accordingly as the recording level of the pilot signal is higher. A high recording level of the pilot signal thus permits the time base variation correcting action to be stably carried out to give a less amount of remnant jitter. However, an excessively high recording level of the pilot signal would cause a leak of the pilot signal into the frequency-modulated color-difference signals or frequency-modulated luminance signal; or a cross-modulation distortion relative to a frequency modulating carrier signal. This would deteriorate the quality of the reproduced image. To avoid this, therefore, the maximum recording level of the pilot signal has been set at such a level that would not have any adverse effect on the frequency-modulated image signal.

However, the reproduction output of the video floppy disc obtained from one recording track differs from the output obtained from another track. If the recording level of the pilot signal is fixed at a level, it brings about the following problem: If the recording level of the pilot signal is set at a level most suited for the innermost track of the video floppy disc which is most prone to the adverse effect of the cross modulation with the frequency modulating carrier signal, the phase of the pilot signal would be affected, during reproduction, by the lower side wave of the frequency modulated luminance signal recorded in a track located on the outer side of the floppy disc. This would hardly permit stable correction of time base variations. Then, an attempt to avoid the adverse effect of the lower side wave of the frequency-modulated luminance signal or the like on the S/N ratio of the pilot signal by setting the recording level of the pilot signal at a higher level would result in an increase in distortion due to the cross modulation with the luminance frequency modulating carrier signal recorded in the inner track. Then, the picture quality would also be deteriorated by occurrence of a moiré in the reproduced image.

The video floppy disc is arranged to be rotated at a fixed speed. Hence, the speed of a magnetic head relative to the video floppy disc varies every time its position shifts from one track over to another. As a result, a reproduced signal obtained from an inner track has a lower level and a poorer S/N ratio than a reproduced signal obtained from an outer track.

Generally, the dispersed degree of the phase error of the pilot signal supplied to the PLL circuit is inversely proportional to its S/N ratio (power ratio) and proportional to the loop noise band of the PLL circuit. If the loop noise band is unvarying, the phase error increases accordingly as the S/N ratio of the incoming pilot signal decreases and the jitter remaining after correction of the time base variations also increases. Therefore, the time base variation correcting accuracy of the PLL circuit is lower for the tracks located on the inner side than the accuracy for the tracks located on the outer side. To solve this problem, it is conceivable to narrow the loop noise band by setting the loop band of the PLL circuit at narrower band in such a way as to have an allowable degree of remaining jitter for the innermost track. However, this method makes the pull-in range of the PLL circuit narrower. Therefore, with the head at an outer side track during a reproducing operation, when the rotating speed suddenly changes due to a large load on a spindle motor which rotates the video floppy disc, the PLL circuit is incapable of following the sudden change.

SUMMARY OF THE INVENTION

It is a general object of this invention to provide an image signal recording and reproducing system which is capable of solving the above-stated problems.

It is a more specific object of the invention to provide an image signal recording apparatus which is capable of recording an image signal on a recording medium in such a form that permits reproduction of the image signal with high picture quality.

Under this object, an image signal recording apparatus arranged according to this invention to record on a recording medium an image signal which is composed of a chrominance signal and a luminance signal including a synchronizing signal, comprises: first modulation means for modulating the luminance signal into a first frequency band; second modulation means for modulating the chrominance signal into a second frequency band which is lower than the first frequency band; pilot signal generating means for generating a pilot signal which is of a frequency between the first and second frequency bands and is phase-locked to the synchronizing signal included in the luminance signal; and recording means for forming a frequency multiplex signal by frequency-multiplexing the luminance signal modulated by the first modulation means, the chrominance signal modulated by the second modulation means and the pilot signal generated by the pilot signal generating means and for recording the frequency multiplex signal on the recording medium.

It is another object of the invention to provide an image signal recording apparatus which is capable of recording an image signal on a disc-shaped recording medium in such a form that enables the recorded image signal to be reproduced with high picture quality.

Under that object, an image signal recording apparatus arranged according to the invention to record an image signal on a disc-shaped recording medium, comprises: reference pilot signal generating means for generating a reference pilot signal to be used for a time base variation correcting process performed during a reproducing operation; level adjusting means for adjusting a level of the reference pilot signal generated by the reference pilot signal generating means according to a recording position on the disc-shaped recording medium of the reference pilot signal; and recording means for forming a frequency multiplex signal by frequency-multiplexing the image signal and the reference pilot signal the level of which has been adjusted by the level adjusting means and for recording the frequency multiplex signal on the disc-shaped recording medium.

It is a further object of the invention to provide an image signal reproducing apparatus which is capable of reproducing an image signal with high picture quality by stably correcting time base variations during a reproducing operation on the image signal recorded on a disc-shaped recording medium irrespectively of the recorded area of the image signal on the recording medium.

Under this object, an image signal reproducing apparatus arranged according to the invention to reproduce an image signal from a disc-shaped recording medium on which a time-base variation correcting pilot signal frequency-multiplexed with the image signal is recorded, comprises: reproducing means for reproducing from the disc-shaped recording medium the image signal and the pilot signal; a phase-locked loop circuit arranged to form a clock signal which is phase-locked to the pilot signal reproduced by the reproducing means and to have a loop band characteristic which varies according to the position of a recording area on the disc-shaped recording medium in which the pilot signal to be reproduced by the reproducing means is recorded; and storing means for storing, in synchronism with the clock signal formed by the phase-locked loop circuit, the image signal reproduced by the reproducing means.

These and other objects and features of the invention will become apparent from the following detailed description of embodiments thereof taken in connection with the accompanying drawings.

BRIEF DESCRIPTION OF THE DRAWINGS

FIG. 1 is a block diagram showing in outline and by way of example the arrangement of the conventional device for storing a still image signal reproduced from a magnetic disc.

FIGS. 2(a) and 2(b) show a time base variation caused by a waveform distortion of a horizontal sync signal obtained by the device of FIG. 1.

FIG. 3 shows the arrangement of two image sensors with the positions of picture elements to be read out from these image sensors.

FIG. 6 is a block diagram showing in outline the arrangement of a still video recording and reproducing system to which this invention is applied as a first embodiment thereof.

FIG. 14 shows the allocation of picture elements corresponding to a signal reproduced from the video floppy disc and interpolating picture elements.

DETAILED DESCRIPTION OF THE PREFERRED EMBODIMENTS

Figure 5:
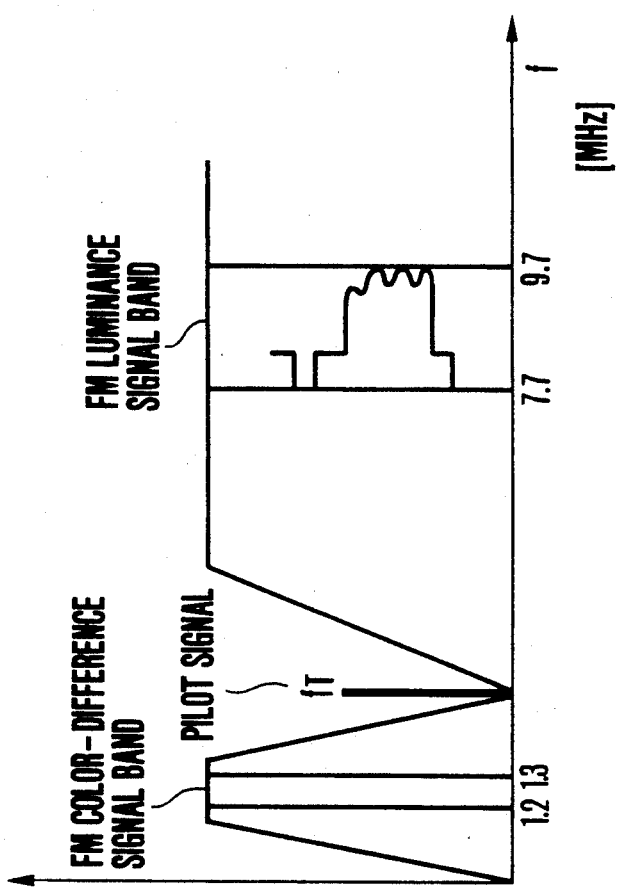
FIG. 5 shows the frequency allocation of signals recorded in each track formed on the video floppy disc.

The following describes the details of this invention through embodiments thereof:

FIG. 6 shows in outline the arrangement of a still video recording and reproducing system to which this invention is applied as a first embodiment thereof.

In recording a still image signal, the first embodiment operates as follows: Referring to FIG. 6, when a TV signal of, for example, the NTSC system is supplied via an input terminal 1, the TV signal is supplied to a recording signal processing circuit 2. At the recording signal processing circuit 2, the TV signal is separated into a carrier chrominance signal and a luminance signal which includes a composite sync signal. The luminance signal separated is subjected to an emphasis process, etc., before it is supplied to a luminance signal frequency modulation circuit 3.

The carrier chrominance signal separated is demodulated into color-difference signals R-Y and B-Y. The color-difference signals are then arranged into a line sequential state and then undergo an emphasis process, etc. The color-difference line-sequential signal thus obtained is supplied to a color-difference line-sequential signal frequency modulation circuit 4. At the luminance signal frequency modulation circuit 3, the luminance signal is frequency-modulated in such a way as to have its sync tip part at 7.7 MHz and its white peak part at 9.7 MHz. At the color-difference line-sequential signal frequency modulation circuit 4, the center frequency of the line sequential signal is set at 1.2 MHz for the color-difference signal R-Y and at 1.3 MHz for the color-difference signal B-Y. The frequency deviation of the signal is frequency-modulated to be 0.7 MHz for the signal R-Y and to be 0.5 MHz for the signal B-Y according to a 75% color bar test.

The frequency-modulated luminance signal output from the luminance signal frequency modulation circuit 3 and the frequency-modulated color-difference line-sequential signal output from the color-difference line-sequential signal frequency modulation circuit 4 are supplied to a multiplex circuit 5.

Meanwhile, the TV signal which has been received at the input terminal 1 is supplied also to a sync signal separation circuit 12. The circuit 12 separates a horizontal sync signal fH from the TV signal. The horizontal sync signal fH separated is supplied to a phase comparison circuit 13. The phase comparison circuit 13 receives also a pilot signal. The pilot signal is obtained by frequency dividing a pilot signal of a frequency fT (=195 fH which is nearly equal to 3.068 MHz) generated by a voltage controlled oscillator (hereinafter referred to as VCO) 15 by means of a 1/195 frequency divider 16 in such a way as to have the same frequency as the frequency of the horizontal sync signal. The phase comparison circuit 13 produces a phase-difference signal indicative of a phase difference between the horizontal sync signal fH separated by the sync signal separation circuit 12 and the signal output from the 1/195 frequency divider 16. The phase-difference signal is supplied to the VCO 15 via a low-pass filter (LPF) 14.

The VCO 15 produces a pilot signal fT which is synchronized with the horizontal sync signal fH separated by the sync signal separation circuit 12. The phase of the pilot signal fT is controlled according to the phase-difference signal supplied from the phase comparison circuit 13 through the LPF 14. In other words, a phase-locked loop (hereinafter referred to as PLL) circuit is formed jointly by the phase comparison circuit 13, the LPF 14, the VCO 15 and the 1/195 frequency divider 16.

The pilot signal fT output from the VCO 15 in the above-stated manner is supplied to an LPF 17 to have its high frequency component removed. After the LPF 17, the pilot signal fT is supplied to the multiplex circuit 5. The multiplex circuit 5 forms a composite image signal by frequency-multiplexing the frequency-modulated luminance signal supplied from the frequency modulation circuit 3, the frequency-modulated color-difference line-sequential signal supplied from the color-difference line-sequential signal frequency modulation circuit 4 and the pilot signal fT. The composite image signal is supplied to a gate circuit 6.

Figure 7:
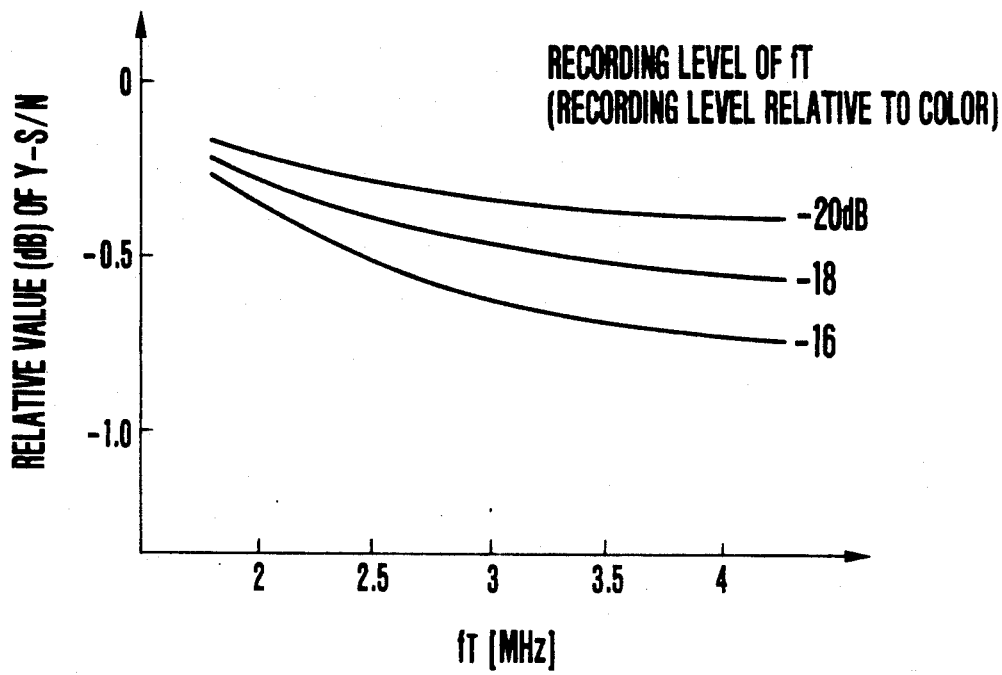
FIG. 7 shows the frequency of a pilot signal fT as in relation to the SN ratio of a luminance signal.

The frequency and the multiplex recording level of the pilot signal fT supplied from the VCO 15 to the multiplex circuit 5 via the LPF 17 are described as follows:

FIG. 7 is a graph showing the frequency of the pilot signal fT on the axis of abscissa with the S/N ratio (Y-S/N) of the luminance signal Y before frequency-multiplexing the pilot signal fT used as reference. The graph shows the degree of deterioration of the Y-S/N ratio with the recording current level of the pilot signal fT (shown in values relative to the recording current level of the frequency-modulated color-difference line-sequential signal) used as a parameter. As apparent from FIG. 7, a leak of the pilot signal fT into the frequency-modulated luminance signal increases to deteriorate the Y-S/N ratio accordingly as the frequency of the pilot signal fT is closer to the band of the frequency-modulated luminance signal. The Y-S/N ratio also deteriorates accordingly as the recording current level of the pilot signal fT increases.

Figure 8:
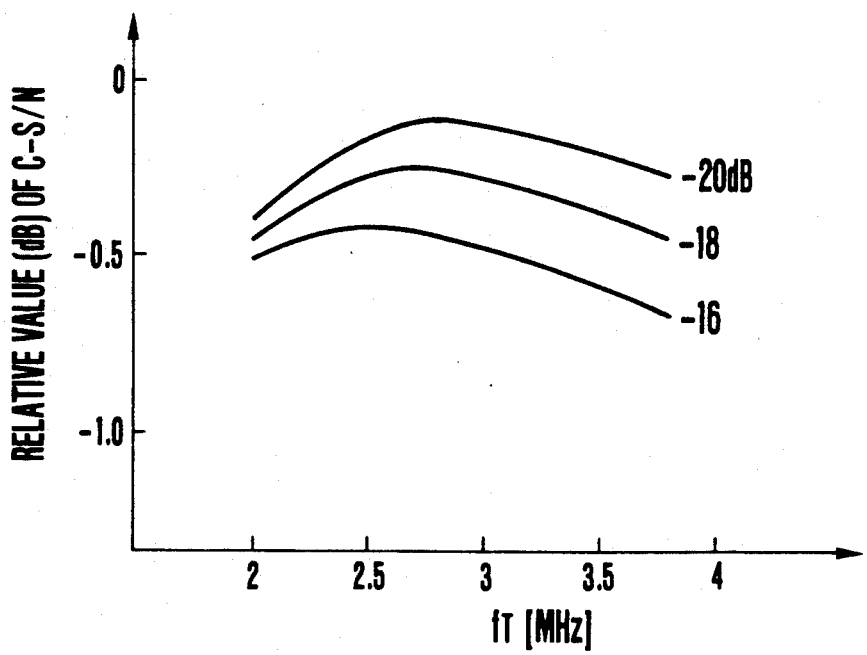
FIG. 8 shows the frequency of the pilot signal fT as in relation to the SN ratio of a color-difference line-sequential signal.

FIG. 8 is a graph having the frequency of the pilot signal fT on the axis of abscissa with the S/N (C-S/N) ratio of the color-difference line-sequential signal before frequency-multiplexing the pilot signal fT used as reference. This graph shows the degree of deterioration of the C-S/N ratio with the recording current level of the pilot signal fT (shown in values relative to the recording current level of the frequency-modulated color-difference line-sequential signal) used as a parameter. As shown in FIG. 8, the C-S/N ratio deteriorates accordingly as the frequency fT of the pilot signal is closer to the frequency band of the frequency-modulated color-difference line-sequential signal. However, with the frequency of the pilot signal fT increased, the degree of deterioration decreases at the frequency value between 2.5 and 3 MHz and then the degree of deterioration again comes to increase.

TABLE 1

| fT recording level (dB) | | fT frequency (MHz) | | | | |
| --- | --- | --- | --- | --- | --- | --- |
| | | 2.0 | 2.5 | 3.0 | 3.5 | 4.0 |
| −16 | Y: | ○ | ○ | △ | X | X |
| | C: | X | X | X | ○ | ○ |
| −18 | Y: | ○ | ○ | ○ | △ | X |
| | C: | X | X | ○ | ○ | ○ |
| −20 | Y: | ○ | ○ | ○ | ○ | △ |
| | C: | X | ○ | ○ | ○ | ○ |

Table 1 above shows the generating states of moiré on a monitor due to the cross-talk of the pilot signal fT to the luminance signal Y and the color-difference line-sequential signal C as detected and estimated by visual sensation. In Table 1, a mark "○" denotes a state of having no visually appreciable moiré. A mark "Δ" denotes a state of having somewhat visually appreciable moiré. Another mark "X" denotes a state of having clearly appreciable moiré. As shown in Table 1, the generation of moiré on the monitor is not visually conspicuous within a wider frequency domain of the pilot signal fT at a lower recording level of the pilot signal fT.

In other words, with the recording level of the pilot signal fT assumed to be −20 dB, the frequency range within which the generation of moiré is inconspicuous is from 2.5 to 3.5 MHz. The frequency domain of the pilot signal fT within which the generation of moiré is inconspicuous becomes narrower accordingly as the recording level of the pilot signal fT is raised. For example, if the pilot signal recording level is −16 dB, both the luminance signal Y and the color-difference line-sequential signal C would be affected by the cross-talk.

Further, in a case where the frequency of the pilot signal fT is set at 3 MHz and the pilot signal recording level at −20 dB, the S/N ratio of the reproduced pilot signal fT is about 25 dB with the resolution band width (RBW) assumed to be 10 KHz. This value is fairly close to a threshold S/N ratio for an input signal to a PLL loop circuit which is disposed on the reproducing side as will be described later.

As described above with reference to FIGS. 7 and 8 and Table 1, the Y-S/N and C-S/N ratios (S/N ratio of the luminance signal Y and that of the color-difference line-sequential signal C) can be prevented from deteriorating or the generation of moiré can be prevented with the frequency of the pilot signal fT set between 2.5 and 3.5 MHz and the recording level thereof set to be less than −18 dB. Further, the adverse effect of the pilot signal fT on the luminance signal and the color-difference line-sequential signal can be mitigated to a fairly great extent by the performance of filters which are arranged on the reproducing side of the system to separate from each other the frequency-modulated luminance signal and the frequency-modulated color-difference line-sequential signal as will be described later. In view of this, the pilot signal fT recording level may be raised further by about 3 dB, i.e., up to −15 dB.

Further, all the test results shown in FIGS. 7 and 8 and Table 1 are obtained by setting the recording current level of the carrier signal of the frequency-modulated color-difference line-sequential signal to be −20 dB relative to that of the carrier of the frequency-modulated luminance signal, for the purpose of ensuring that: During a reproducing operation, a cross modulation signal (Y-2C) obtained from the carrier signal of the frequency-modulated luminance signal and that of the frequency-modulated color-difference line-sequential signal never be at such a level that would cause any beat of the luminance signal. For example, the level of the cross modulation signal Y-2C is arranged to be less than −33 dB relative to the level of the carrier signal of the frequency-modulated luminance signal during reproduction.

Figure 9:
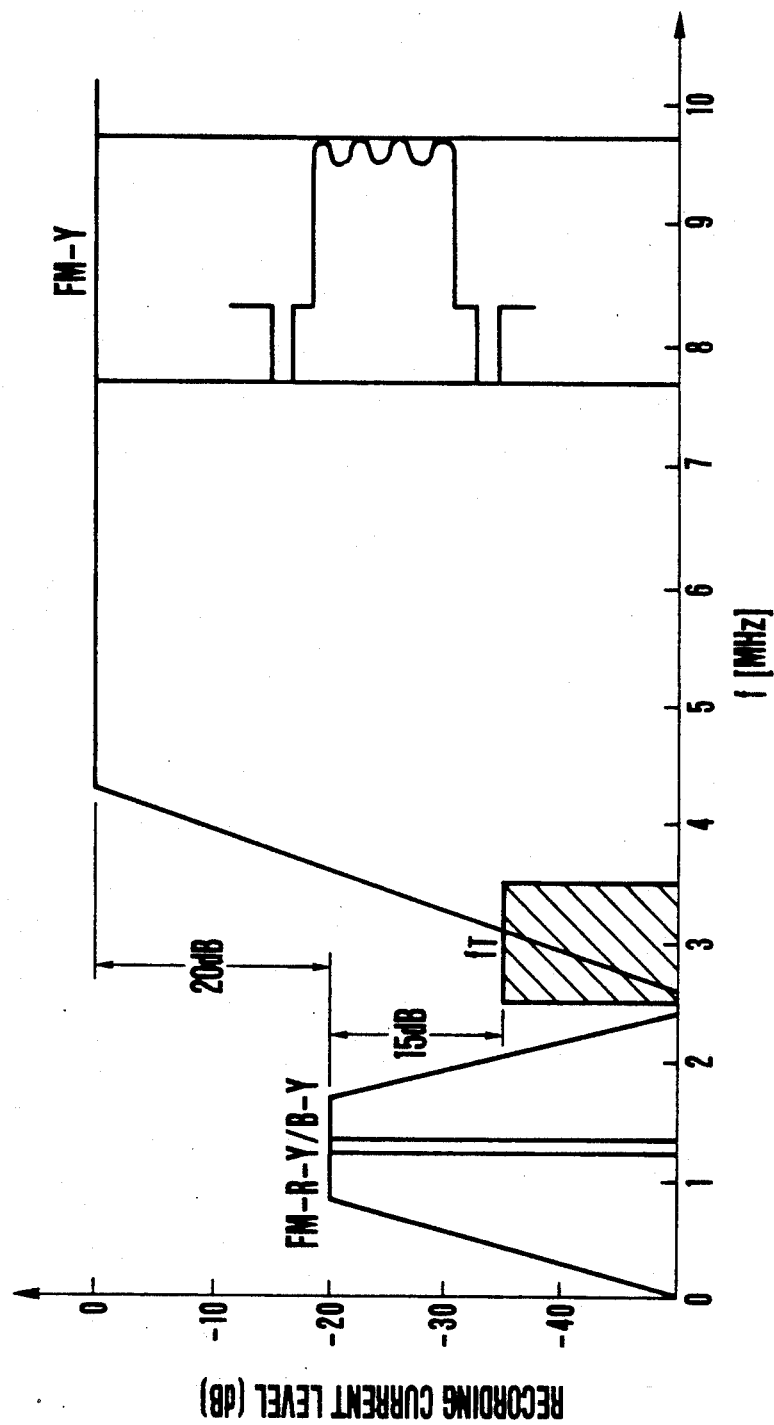
FIG. 9 shows the frequency allocation of a composite image signal recorded on a magnetic disc.

FIG. 9 shows a frequency allocation to be made in frequency-multiplexing the pilot signal fT which has its frequency and recording level set as described above along with the frequency-modulated luminance signal FM-Y and the frequency-modulated color-difference line-sequential signal FM-R-Y/B-Y. In FIG. 9, the frequency domain of the pilot signal fT is indicated with hatching.

At the multiplex circuit 5, the frequency-modulated luminance signal, the frequency-modulated color-difference line-sequential signal and the pilot signal are frequency-multiplexed at the above-stated recording current level to obtain a composite image signal. The composite image signal is supplied to the gate circuit 6.

In accordance with gate pulses output from a system controller which is not shown, the gate circuit 6 allows the composite image signal supplied from the multiplex circuit 5 to be alternately output from the terminals A and B thereof for every field period. The composite image signal output from the gate circuit 6 is amplified respectively by recording amplifiers 7a and 7b. The amplified signals are supplied to magnetic heads 9a and 9b via change-over switches S1 and S2 each of which is connected to one side R thereof in the case of recording in accordance with an instruction received from the system controller which is not shown.

When an instruction for commencement of recording is received from an operation part which is not shown, the system controller produces an instruction to cause a magnetic disc 10 to be rotated by a motor 11 at a given rotational frequency. Meanwhile, the magnetic heads 9a and 9b are shifted by a head shifting mechanism 8 to a track position on the magnetic disc 10 designated by the above-stated operation part. Then, one-field amounts of the composite image signals supplied from the gate circuit 6 via the recording amplifiers 7a and 7b are recorded in two adjacent recording tracks respectively.

In reproducing a still image signal, the embodiment operates as follows: Upon receipt of an instruction from the operation part which is not shown for commencement of a reproducing action, the system controller which is not shown produces an instruction to cause the magnetic disc 10 to be rotated at a given rotational frequency by the motor 11. Meanwhile, the head shifting mechanism 8 shifts the magnetic heads 9a and 9b to a designated track position on the magnetic disc 10 in accordance with the instruction given from the operation part. The connecting position of each of the change-over switches S1 and S2 is shifted to one side P thereof.

Composite image signals reproduced by the magnetic heads 9a and 9b are supplied to a reproduction amplifier 18. Meanwhile, a field change-over signal FI which is arranged to invert its polarity every time the magnetic disc 10 makes one turn is supplied from the system controller to the reproduction amplifier 18. After amplifying the composite image signals received from the magnetic heads 9a and 9b, the amplifier 18 produces them in rotation one after the other for every field period. The composite image signal thus output from the reproduction amplifier 18 is supplied to a high-pass filter (HPF) 19, a low-pass filter (LPF) 21 and a band-pass filter BPF) 24.

The HPF 19 separates the frequency-modulated luminance signal from the composite image signal received. The luminance signal is supplied to a luminance signal frequency demodulation circuit 20 to be demodulated there. The demodulated luminance signal is supplied to a reproduced signal processing circuit 23. The LPF 21 separates the frequency-modulated color-difference line-sequential signal from the composite image signal received. The color-difference line-sequential signal is then supplied to a color-difference line-sequential signal frequency demodulation circuit 22 to be demodulated there. The demodulated color-difference line-sequential signal is supplied to the reproduced signal processing circuit 23.

At the reproduced signal processing circuit 23, the luminance signal from the luminance signal demodulation circuit 20 is subjected to a deemphasis process which is carried out in a manner reverse to the emphasis process performed for recording by the recording signal processing circuit 2. After that, the luminance signal is supplied to a matrix circuit 31. The color-difference line-sequential signal which is supplied from the color-difference line-sequential signal frequency demodulation circuit 22 is also subjected to a deemphasis process which is carried out in a manner reverse to the emphasis process performed for recording. After the deemphasis process, the color-difference line-sequential signal is converted into a line-simultaneous state and is thus restored to its original forms of color-difference signals R-Y and B-Y. The color-difference signals R-Y and B-Y are supplied also to the matrix circuit 31.

At the matrix circuit 31, the luminance signal Y and the color-difference signals R-Y and B-Y received from the reproduced signal processing circuit 23 are converted into three primary color signals R, G and B. These primary color signals are supplied to an analog-to-digital converter 32.

At the BPF 24, the pilot signal fT (=195 fH) is separated from the composite image signal received from the amplifier 18. The pilot signal fT is then amplified to a given level by an amplifier 25. A limiter circuit 26 removes amplitude variations from the amplified pilot signal before the pilot signal is supplied to a phase comparison circuit 27.

To the phase comparison circuit 27 is also supplied a clock pulse signal of a frequency 780 fH (about 12.27 MHz) which is generated by a voltage controlled oscillator (VCO) 29. This clock pulse signal has been frequency-divided by a ¼ frequency divider 30 to be of the same frequency as that of the pilot signal fT. The phase comparison circuit 27 produces a phase-difference signal indicative of a phase difference between the pilot signal fT supplied from the limiter circuit 26 and the clock pulse signal output from the ¼ frequency divider 30. The phase-difference signal is supplied via a low-pass filter (LPF) 28 to the VCO 29.

The phase of the clock pulse signal generated by the VCO 29 is controlled in accordance with the phase-difference signal supplied via the LPF 28 from the phase comparison circuit 27. Under this control, the VCO 29 produces the clock pulse signal which is phase-locked to the pilot signal wherein a jitter component generated during the process of reproduction is included. In other words, a PLL circuit is formed jointly by the phase comparison circuit 27, the LPF 28, the VCO 29 and the ¼ frequency divider 30.

The clock pulse signal output from the VCO 29 in the above-stated manner is supplied to an A/D converter 32 and a memory circuit 33. At the A/D converter 32, three-primary color data is formed by digitizing three primary color signals R, G and B output from the matrix circuit 31 in synchronism with the clock pulse signal supplied from the VCO 29. The three-primary color data is stored in the memory circuit 33.

After the three-primary color data is stored in the memory circuit 33, a reference clock pulse signal which has no time variations is generated and output from a reference clock pulse signal oscillator 35 which is composed of a quartz crystal oscillator, etc. The three-primary color data stored is read out from the memory circuit 33 in synchronism with the reference clock pulse signal. The three-primary color data read out is supplied to a digital-to-analog (D/A) converter 34 to be converted into analog three-primary color signals R, G and B also in synchronism with the reference clock pulse signal. The three-primary color signals R, G and B output from the A/A converter 34 are supplied to a conversion circuit 36 to be converted, for example, into a TV signal of the NTSC system. The TV signal thus obtained is supplied to a monitor device which is not shown. The monitor device then displays a still image.

As described above, the reproduced still image signal is stored in the memory circuit in accordance with the clock pulse signal phase-locked to the pilot signal which has the same time base variations as those of the still image signal reproduced on the reproducing side of the system. After that, the still image signal stored in the memory circuit is read out in accordance with the reference clock pulse signal which has no time variations. This arrangement effectively corrects the time base variations occurred during the process of reproduction, so that the still image signal can be produced with a high degree of picture quality.

In the first embodiment described, the frequency of the pilot signal fT is set at 195 fH. However, in accordance with this invention, the pilot signal frequency is not limited to this value. Any frequency that is within a range from 2.5 MHz to 3.5 MHz is acceptable.

Figure 10:
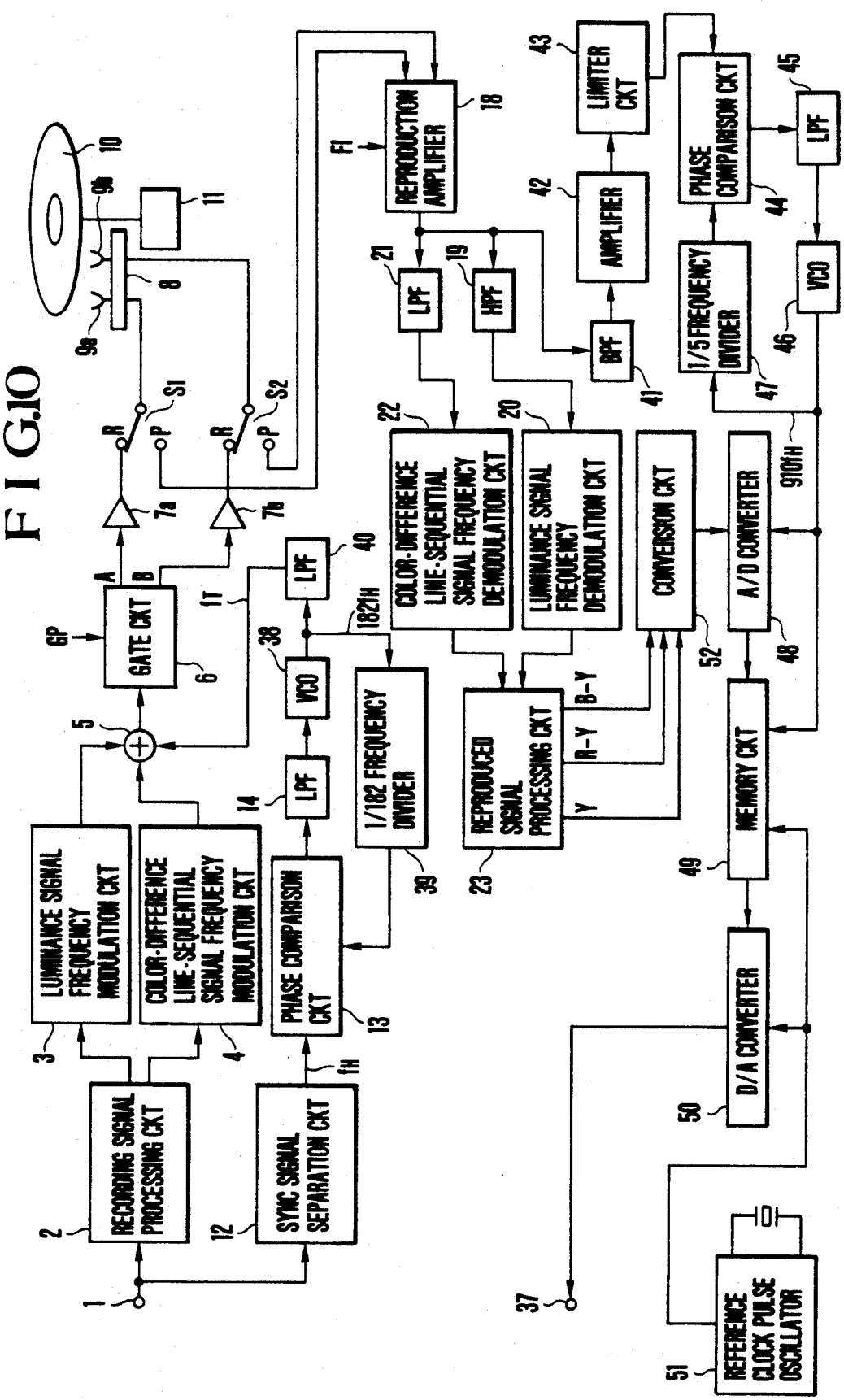
FIG. 10 is a diagram showing in outline the arrangement of a still video recording and reproducing system to which this invention is applied as a second embodiment thereof.

FIG. 10 shows in outline the arrangement of a still video recording and reproducing system which is arranged according to this invention as a second embodiment thereof. In FIG. 10, the same component parts as those of FIG. 6 are indicated by the same reference numerals and the details of them are omitted from the following description. In the case of FIG. 10, memory circuit 49 on the reproducing side of the system is arranged to store the still image signal in the form of a composite signal. For this purpose, the frequency of the clock pulse signal to be supplied to the A/D converter 48 and the memory circuit 49 is set at 4 fsc (=910 fH; and fsc is a color subcarrier frequency). On the recording side of the system, the frequency of the pilot signal fT to be multiplexed with the still image signal is set at 182 fH (about 2.86 MHz).

On the recording side of the second embodiment shown in FIG. 10, since the pilot signal fT of frequency 182 fH is generated by the VCO 38, the frequency dividing rate of the frequency divider 39 is set at 1/182; and the LPF 40 is also arranged to have a characteristic suited for this pilot signal.

On the reproducing side, a clock pulse signal of a frequency 910 fH (=4 fsc) is generated by a VCO 46. The clock pulse signal is controlled to be phase-locked to the pilot signal fT which has been multiplexed on the recording side and has the frequency 182 fH. For this purpose, the frequency dividing rate of a frequency divider 47 is set at 1/5; and a BPF 41, an amplifier 42, a limiter circuit 43, a phase comparison circuit 44 and an LPF 45 are arranged to have characteristics corresponding to the pilot signal fT.

In order that a still image signal is stored in the form of a composite signal in the memory circuit 49, the second embodiment is arranged as follows: A luminance signal Y and color-difference signals R-Y and B-Y output from a reproduced signal processing circuit 23 are converted into a composite signal, such as a TV signal of the NTSC system, by a conversion circuit 52. The composition signal thus obtained is supplied to an A/D converter 48 to be digitized in synchronism with the clock pulse signal which is of the frequency 910 fH (=4 fsc) and has been output from the above-stated VCO 46. The digital data thus obtained is stored in the memory circuit 49. In reading the data out from the memory circuit 49, the embodiment operates as follows: A reference clock pulse signal of the frequency 910 fH (=4 fsc) is generated by a reference clock pulse oscillator 51. The data is read out from the memory circuit 49 in synchronism with the reference clock pulse signal. The data read out is supplied to a D/A converter 50 to be restored to its original analog signal. The analog signal thus obtained is output from an output terminal 37.

The second embodiment is thus arranged to store the still image signal in the state of a composite signal in the memory circuit as described above.

Figures 3, 14:
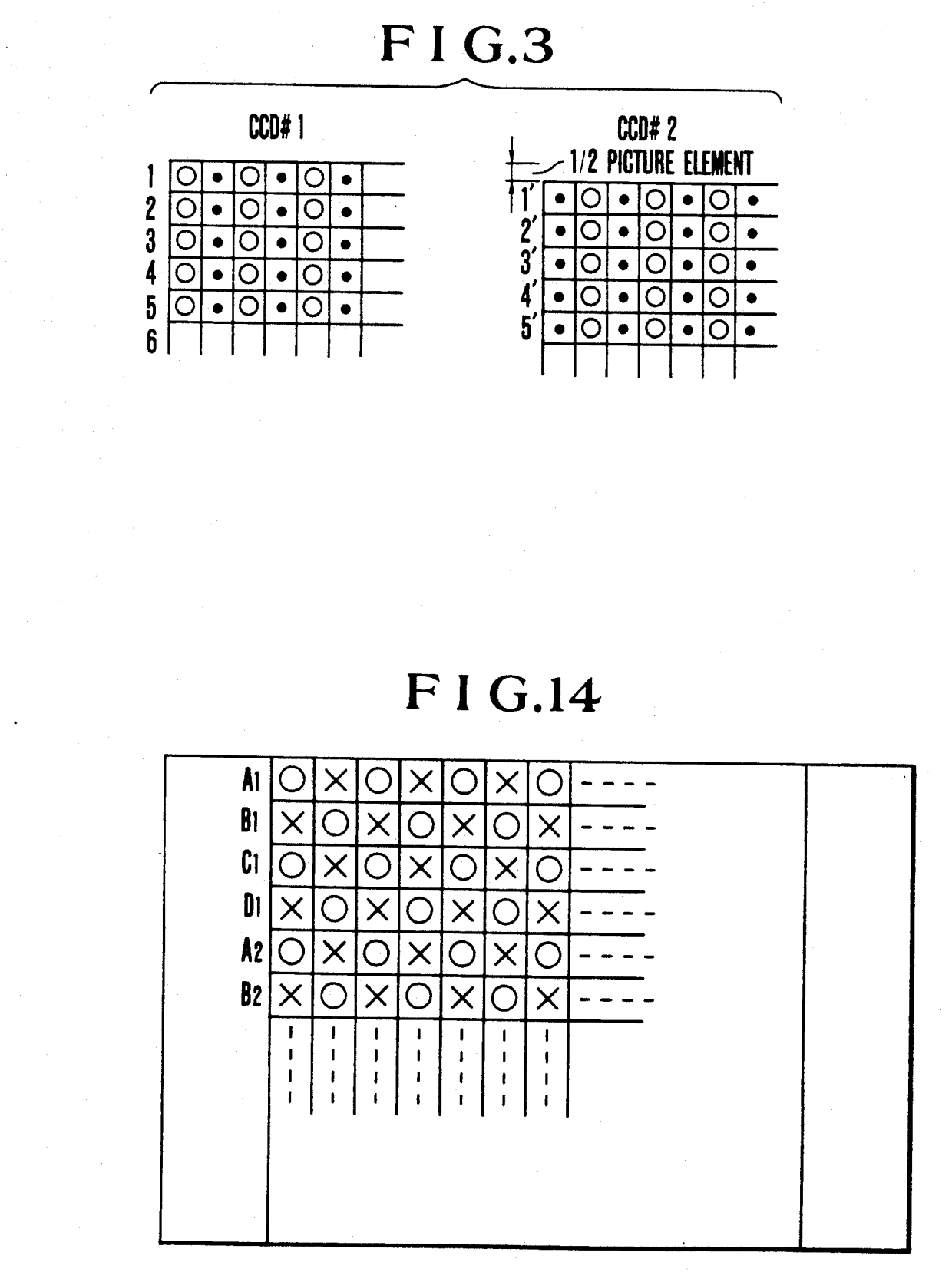
Figure 11:
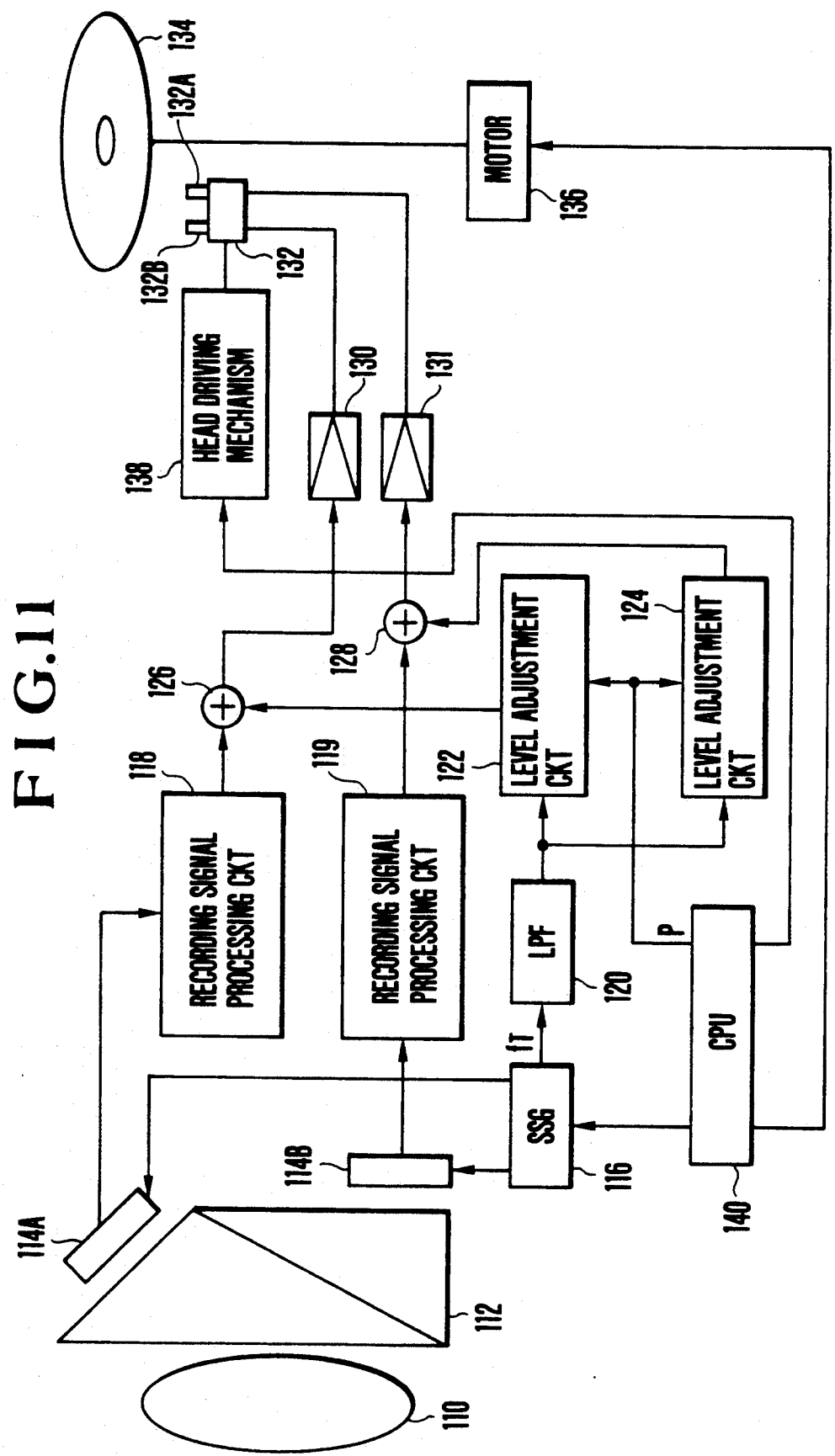
FIG. 11 is a diagram showing in outline the arrangement of a still video camera to which the invention is applied as a third embodiment thereof.

FIG. 11 shows in a block diagram the arrangement of a still video camera which is arranged as a third embodiment of the invention. The illustration includes a phototaking lens 110; a splitting prism 112; and image sensors 114A and 114B which are arranged to convert into electrical signals an image of an object which is split by the prism 112. The image sensors 114A and 114B are for a black-and-white image and have 1,200 picture elements in the horizontal direction and 500 in the vertical direction. They are arranged to be in a positional relation as shown in FIG. 3. A standard signal generating circuit (hereinafter referred to as SSG) 116 is arranged to generate driving pulses for driving the image sensors 114A and 114B and also to generate a pilot signal fT which will be described later herein. Each of recording signal processing circuits 118 and 119 consists of a pre-emphasis circuit, a frequency modulation circuit, etc.

An LPF 120 is arranged to remove a high frequency component from the pilot signal. Level adjustment circuits 122 and 124 are arranged to adjust the recording level of the pilot signal. Mixing circuits 126 and 128 are arranged to mix the level-adjusted pilot signal with frequency-modulated luminance signals. Reference numerals 130 and 131 denote recording amplifiers. A thin-film two-channel head 132 consists of a head 132A for a channel #1 and a head 132B for a channel #2. A numeral 134 denotes a video floppy disc. A numeral 136 denotes a spindle motor. A head driving mechanism 138 is arranged to shift the position of the head in the radial direction of the video floppy disc 134. A control circuit (CPU) 140 is arranged to control the sequence of actions of the whole still video camera.

The recording operation of the third embodiment is described as follows with reference to FIG. 11: When an instruction for commencement of recording is given to the control circuit 140 by operating a start button which is not shown, signals of odd-number lines 1 (1'), 3 (3'), 5 (5'), ... are simultaneously output from the image sensors 114A and 114B in accordance with sampling clock signals which are of a frequency 3 fsc (fsc: color subcarrier frequency) and have their phases differ 180 degrees from each other. The outputs of the image sensors 114A and 114B are supplied to the recording signal processing circuits 118 and 119 to be subjected to processes such as frequency modulation, etc. The mixing circuits 126 and 128 mix the pilot signal with the frequency-modulated luminance signals output from the recording signal processing circuits 118 and 119. Signals output from the mixing circuits 126 and 128 are supplied to recording amplifiers 130 and 131 to be amplified to a current level suited for recording. The outputs of the recording amplifiers 130 and 131 are simultaneously applied to the heads 132A and 132B while the video floppy disc 134 makes one turn, that is, during a period of 1/60 sec. The heads 132A and 132B then record them on the video floppy disc 134.

Next, the head driving mechanism 138 shifts the head 132 to an extent corresponding to two recording tracks radially on the video floppy disc 134. After that, signals of even-number lines 2 (2'), 4 (4'), 6 (6'), ... are read out from the image sensors 114A and 114B. These even-number-line signals are simultaneously recorded on the video floppy disc 134 by the heads 132A and 132B in the same manner as the odd-number-line signals.

Figure 4:
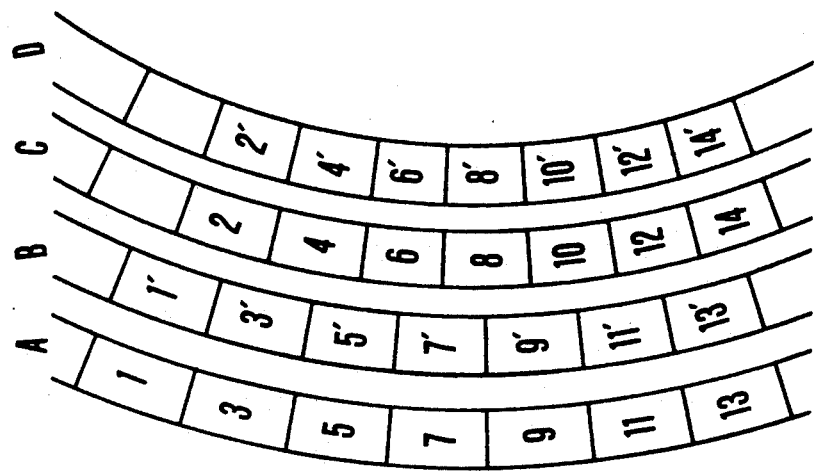
FIG. 4 shows a recording pattern of tracks formed on a video floppy disc.

Through the processes described above, a four-field amount (or a two-frame amount) of the image signal is recorded in four tracks on the video floppy disc 134 in a recording patterns as shown in FIG. 4.

The third embodiment is arranged to generate the pilot signal in the following manner: The frequency of the pilot signal is set, for example, at 168 fH (fH: the frequency of the horizontal sync signal). The standard signal generating circuit 116 generates the pilot signal fT in such a way as to have the pilot signal phase-locked to the above-stated sampling clock signal of 3 fsc. The pilot signal fT of course may be obtained from the sampling clock signal 3 fsc by means of a PLL circuit. The pilot signal fT is applied to the level adjustment circuits 122 and 124 via the LPF 120.

Figure 12:
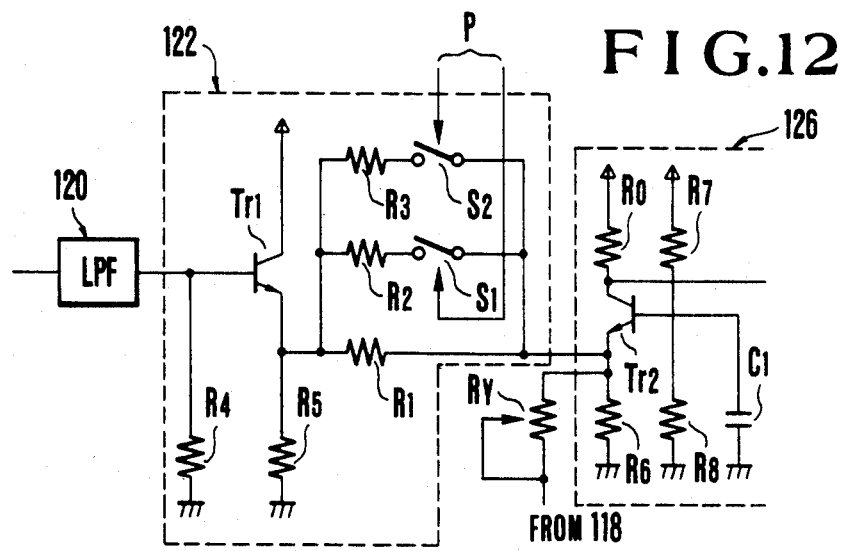
FIG. 12 is a circuit diagram showing the details of a level adjustment circuit shown in FIG. 11.

FIG. 12 shows by way of example the details of the level adjustment circuit 122 together with a part of the mixing circuit 126. Referring to FIG. 12, a variable resistor $R_Y$ is arranged to adjust the recording level of the frequency-modulated luminance signal. Resistors R1, R2 and R3 are provided for adjusting the pilot signal mixing ratio (a current ratio). The composite resistance value of the resistors R1, R2 and R3 is changed by turning on and off switches S1 and S2. In other words, in the case of arrangement shown in FIG. 12, the mixing ratio of the pilot signal is selectable from three different ratio values by turning on and off the switches S1 and S2. A total of 50 recording tracks can be formed and arranged in the order of first to 50th tracks as counted from the outer periphery of the video floppy disc. For example, the recording level of the pilot signal fT is set at −35 dB for the first to 20th tracks, at −37 dB for the 21st to 35th tracks and at −39 dB for the 36th to 50th tracks. The recording level −39 dB is deemed to be the threshold level for keeping the possible moir within an inconspicuous range. For setting the pilot signal recording level at −39 dB, the resistance values of the resistors are set at suitable values in a relation of R1<R2<R3. The recording levels thus can be varied stepwise by 2 dB. For example, a control signal P causes the switch S1 to be turned on and the switch S2 to be turned off when the heads 132A and 132B which are shifted by the head driving mechanism 138 in accordance with an instruction from the CPU 140 are between the first and 20th tracks on the video floppy disc 134. The switch S1 is turned off and the switch S2 turned on when the heads are between the 21st and 35th tracks. Both the switches S1 and S2 are turned off when the heads are between the 36th and 50th tracks.

Figure 13:
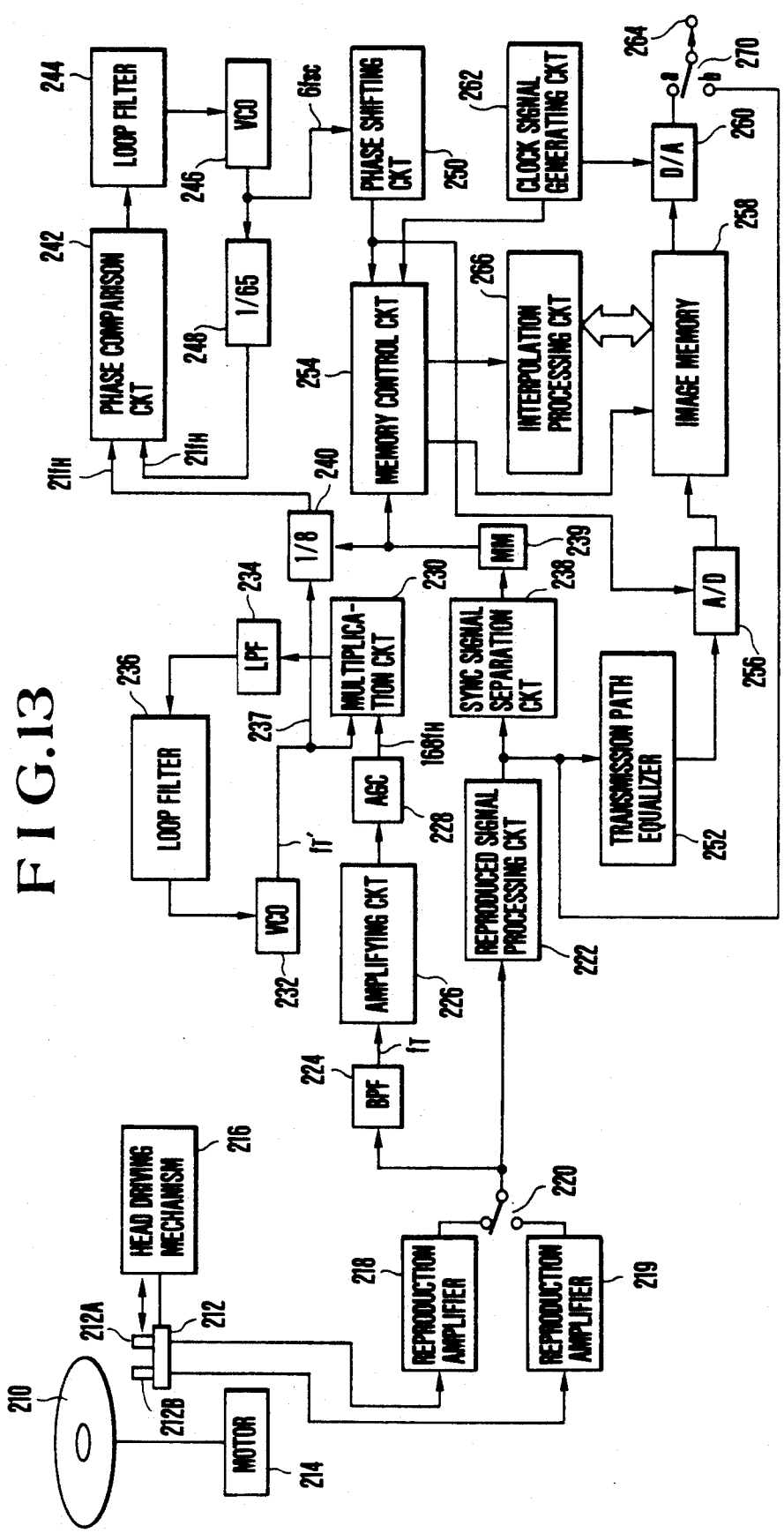
FIG. 13 is a diagram showing in outline the arrangement of a reproducing apparatus corresponding to the still video camera of FIG. 11.

The reproducing arrangement of the third embodiment and its operation are as follows: The reproducing arrangement may be either incorporated in the still video camera of FIG. 11 or arranged discretely from the still video camera. FIG. 13 shows it in a block diagram as in a state of being arranged as a discrete reproducing apparatus of the third embodiment. Referring to FIG. 13, a video floppy disc 210 is assumed to have signals recorded thereon in a recording pattern as shown in FIG. 4. The video floppy disc corresponds to the floppy disc 134 of FIG. 11. A thin-film two-channel head 212 consists of a head 212A which is for a channel #1 and another head 212B which is for a channel #2. The reproducing apparatus includes a spindle motor 214; a head driving mechanism 216; reproduction amplifiers 218 and 219 which are arranged in combination with the heads 212A and 212B; a channel change-over switch 220; a reproduced signal processing circuit 222 which consists of an equalizer circuit; a deemphasis circuit, etc.; a BPF 224 which is arranged to separate a pilot signal fT; an amplifying circuit 226; an automatic gain control circuit (hereinafter referred to as AGC) circuit 228 which is arranged to keep the amplitude of the reproduced pilot signal fT at a suitable level; and a multiplication circuit 230 which serves as a phase comparison circuit.

A voltage controlled oscillation circuit (VCO) 232 is arranged to generate a signal of a frequency which is in the neighborhood of 168 fH. An LPF 234 is arranged to take out a signal representing a frequency-difference component between the signal output from the VCO 232 and the reproduced pilot signal. A loop filter 236 has its loop band set at a value between about 500 Hz and 2 KHz. These circuits 230, 232, 234 and 236 generate a signal 237 which is of the frequency 168 fH and is phase-locked to the reproduced pilot signal.

A sync signal separation circuit 238 is arranged to separate a sync signal from a demodulated image signal. A monostable multivibrator (hereinafter referred to as MM) 239 is arranged to remove equalizing pulses. A frequency dividing circuit 240 is arranged to be reset by a horizontal sync signal output from the MM 239 and to divide the frequency of the signal 237 into $\frac{1}{8}$. A reference numeral 242 denotes a phase comparison circuit. A loop filter 244 has a loop band which is at least equal to that of the above-stated loop filter 236. A VCO (voltage controlled oscillation circuit) 246 is arranged to generate a signal of frequency which is nearly 6 fsc (1365 fH). A frequency dividing circuit 248 is arranged to divide the frequency of the output of the VCO 246 into 1/65. In other words, the circuits 242, 244, 246 and 248 jointly form a phase-locked loop circuit, which is arranged to form a memory writing clock signal (6 fsc).

A phase shifting circuit 250 is arranged to adjust the sampling clock signal to the sampling point of the image signal. A transmission path equalizer 252 is arranged to adjust the amplitude and phase characteristics of the demodulated signal. The reproducing apparatus further includes a memory control circuit 254; an A/D converter 256; an image memory 258; a D/A converter 260; a reading clock signal generating circuit 262; an image output terminal 264; an interpolation processing circuit 266; and a switch 270 which is arranged to effect change-over from the reproduced image signal to the output of the image memory 258 and vice versa.

The reproducing apparatus of the third embodiment shown in FIG. 13 performs a reproducing operation as follows: A frame image signal having the same degree of resolution as the image signal of the conventional apparatus can be obtained when the heads 212A and 212B are set at the tracks B and C on the video floppy disc shown in FIG. 4 by the head driving mechanism 216 in accordance with an instruction given from a system controller which is not shown. In this case, the outputs of the heads 212A and 212B are amplified by the reproduction amplifiers 218 and 219. The switch 220 alternately allows the outputs of the heads to pass by switching them from one over to the other every 1/30 sec. The switch 220 thus outputs a reproduced frame image signal. The reproduced frame image signal from the switch 220 is applied to the reproduced signal processing circuit 222. At the circuit 222, the reproduced frame image signal is subjected to varied processes including a frequency demodulating process, a deemphasis process, etc. Then, with the connecting position of switch 270 shifted to one side "b" thereof, the outputs of the reproduced signal processing circuit 222 are allowed to be output from the output terminal 264 as the frame image signal having a degree of resolution equal to that of the signal obtained by the conventional apparatus.

Next, in obtaining a high quality (definition) image signal through a process of interpolating picture elements by taking a four-field amount of image signal into the image memory 258, the reproducing operation is performed in the following manner: First, in accordance with an instruction from the system controller which is not shown, the head 212A is shifted to a position to abut on a track A which is as shown in FIG. 4. Then, a one-field amount of image signal is reproduced by the head 212A. The reproduced signal is applied via the reproduction amplifier 218 and the switch 220 to the reproduced signal processing circuit 222 and the BPF 224. The reproduced signal processing circuit 222 performs its processing action in the same manner as described in the foregoing. The sync signal is separated by the sync signal separation circuit 238. The MM 239 removes equalizing pulses of $\frac{1}{2}$ H to produce only a horizontal sync signal. The horizontal sync signal is applied to the memory control circuit 254 as a horizontal reset pulse for memory writing.

Meanwhile, the pilot signal is separated by the BPF 224 which has the center frequency of its passing frequency band set at 168 fH=2.63 MHz. The pilot signal thus separated is supplied to the amplifying circuit 226 to be amplified up to a suitable level. The amplified pilot signal is supplied to the AGC circuit 228 to be kept at a given amplitude level. The multiplication circuit 230 performs a multiplying operation on the output of the VCO 232 and that of the AGC circuit 228. The LPF 234 takes out from the output of the multiplication circuit 230 a component corresponding to a phase difference between the two inputs of the multiplication circuit 230. The phase-difference signal thus obtained is supplied to the loop filter 236. The loop filter 236 then converts the output of the LPF 234 into an error voltage. The error voltage is supplied to the VCO 232.

The recording level of the pilot signal is arranged, as mentioned in the foregoing, to be higher for the outer-side tracks of the video floppy disc where the pilot signal is apt to be affected by the lower side-band of the frequency-modulated luminance signal. Therefore, in reproducing signals from the outer-side tracks, the reproduced pilot signal has a sufficiently high S/N ratio to give a stable PLL characteristic.

The signal 237 output from the VCO 232 is thus phase-locked to the reproduced pilot signal and is frequency-divided into $\frac{1}{8}$ by the frequency dividing circuit 240 before it is applied to the phase comparison circuit 242. To the other input terminal of the phase comparison circuit 242 is applied a signal (21 fH) which is obtained by frequency-dividing the output of the VCO 246 into 1/65 by the frequency dividing circuit 248. The phase comparison circuit 242 then produces a phase-difference signal. The phase-difference signal is converted into an error voltage by the loop filter 244. The error voltage is applied to the control terminal of the VCO 246. This causes the VCO 246 to produce the clock pulse signal of a frequency 6 fsc which is phase-locked to the above-stated signal 237. The phase of the clock pulse signal is adjusted by the phase shifting circuit 250 before it is supplied to the memory control circuit 254 and the A/D converter 256.

Meanwhile, the reproduced image signal which has its amplitude and phase characteristics corrected by the transmission path equalizer 252 is supplied to the A/D converter 256 to be digitized in synchronism with the clock pulse signal supplied from the VCO 246 through the phase shifting circuit 250. The digital image signal thus obtained is written into the image memory 258 at a writing address designated by the memory control circuit 254 in synchronism with the clock pulse signal.

The one-field amount of reproduced image signal obtained from the track A of the video floppy disc 210 which is as shown in FIG. 4 is thus stored in the image memory 258 in the above-stated manner. After that, an image signal which is reproduced from the track B of the video floppy disc 210 by the other head 212B is likewise processed and is also stored in the image memory 258. Following this, the head driving mechanism 216 is caused to radially shift the heads 212A and 212B on the video floppy disc 210 to an extent corresponding to two tracks to bring them to the tracks C and D which are as shown in FIG. 4. The image signals recorded in the tracks C and D are reproduced and stored in the image memory 258. A four-field amount of image signal which is thus stored in the image memory 258 corresponds to picture elements which are indicated by a mark "o" in FIG. 14. The interpolation processing circuit 266 reads out the image signal from the image memory 258 to form an interpolation image signal which corresponds to picture elements indicated by a mark X in FIG. 14. The interpolation image signal thus formed is stored in the image memory 258. The reproduced image signal and the interpolation image signal are thus stored together in the image memory 258. After that, the memory control circuit 254 designates reading addresses of the image memory 258 in synchronism with a reading clock signal which is supplied for a high quality image signal from the reading clock signal generating circuit 262. The image signal stored in the image memory 258 is thus read out and supplied to the D/A converter 260 to be converted into an analog signal in synchronism with the above-stated reading clock signal. The analog image signal is then supplied to a terminal "a" of the switch 270. Then, with the connecting position of the switch 270 shifted to the terminal "a", an image signal of high quality is output from the output terminal 264.

In this instance, an arrangement to have a sync signal generated from the memory control circuit 254 for a high quality image signal and supplied to an external high-quality monitor along with the high quality image signal enables the external high quality monitor to display a high quality image.

Figure 15:
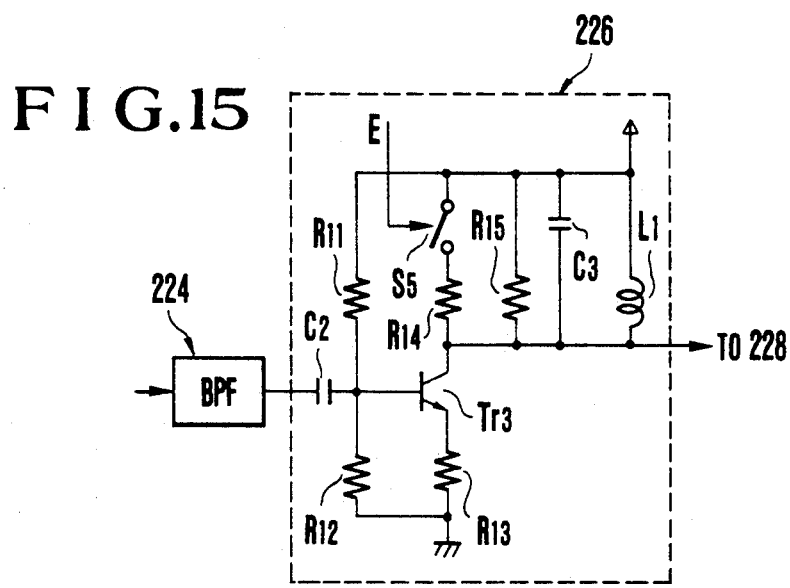
FIG. 15 is a circuit diagram showing the circuit arrangement of an amplification circuit shown in FIG. 13.

In cases where the pilot signal recorded in the inner-side tracks of the video floppy disc cannot be reproduced with a sufficient S/N ratio in accordance with the reproducing arrangement shown in FIG. 13, the S/N ratio can be improved by arranging the amplifying circuit 226 to be a tuning amplifier in such a way as to increase the Q-value of the amplifier in reproducing the pilot signal from the inner-side tracks. Further, in another solution of this problem, the amplifying circuit 226 is arranged to be of the collector resonance type as shown in FIG. 15. Then, in reproducing signals from the 36th track and tracks subsequent thereto, the S/N ratio in question can be improved by raising the Q-value of the amplifier by turning off a switch S5 by means of a control signal E output from a system controller which is not shown. Further, the characteristic of an equalizing circuit which is provided for equalizing reproduced signals during a reproducing operation may be arranged to be controlled by the above-stated control signal E.

The number of different values to which the pilot signal recording level is changeable and the track position at which the recording level is to be changed from one value over to another are not limited to those of the third embodiment described. The degree to which the recording level is to be changed at a time is not limited to 2 dB as in the case of the third embodiment. The recording level changing degree may be changed according to the leaking amount of the lower side-band of the frequency-modulated signal.

The third embodiment which is described above is capable of accurately correcting time-base variations by forming a stable time-base correcting clock signal from the reproduced pilot signal during the process of a reproducing operation. The third embodiment is also capable of giving a reproduced image of high quality by preventing occurrence of a moiré or the like due to an adverse effect of the pilot signal on the image signal.

Figure 16:
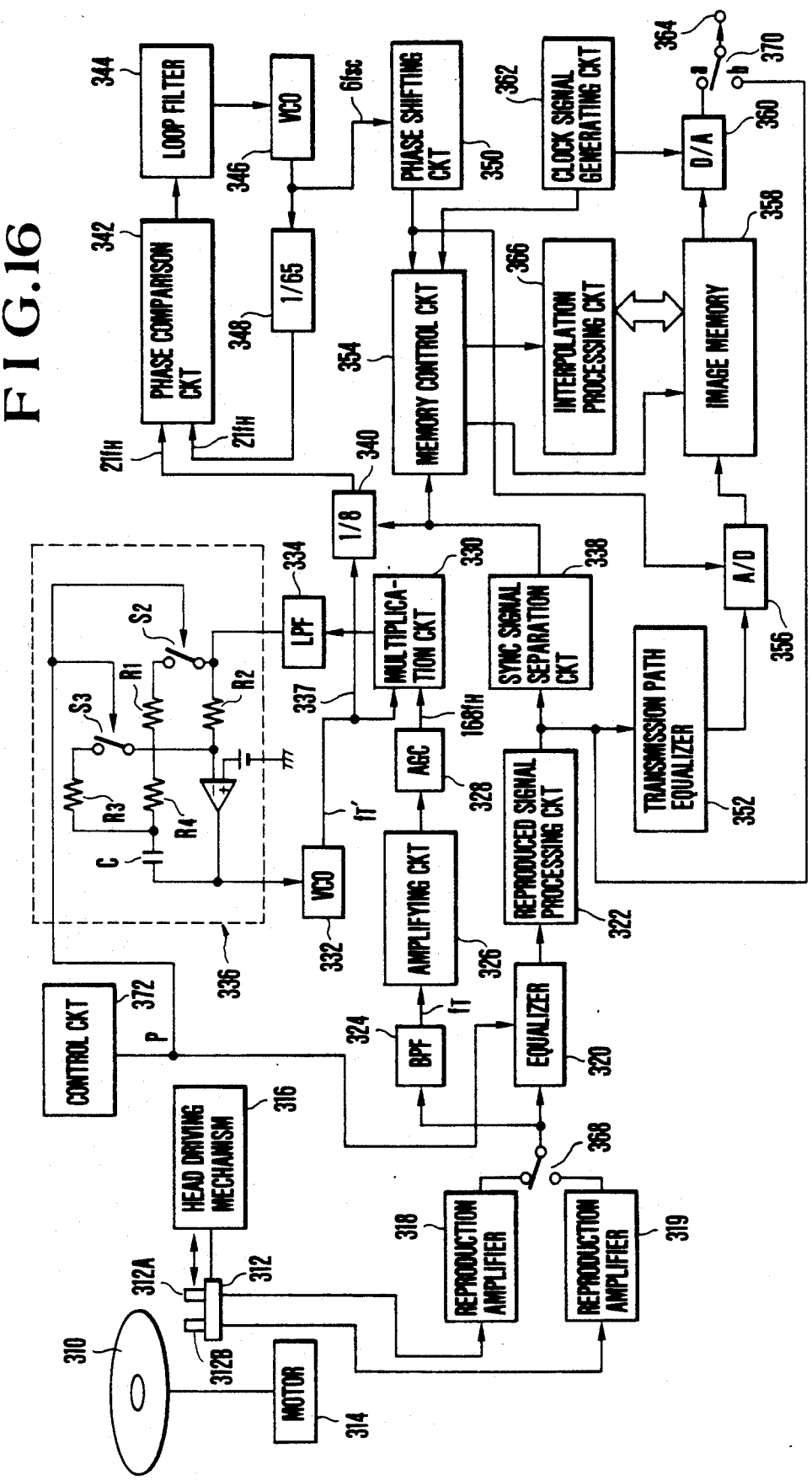
FIG. 16 is a block diagram showing the arrangement of a reproducing apparatus included in the still video system to which this invention is applied as a fourth embodiment thereof.

FIG. 16 is a block diagram showing the reproducing arrangement of a still video system arranged as a fourth embodiment of the invention. Referring to FIG. 16, a video floppy disc 310 has a total of 50 tracks formed and numbered in the order of first to 50th tracks as counted from the outer periphery of the disc. In the case of the fourth embodiment, an image signal corresponding to the picture elements which are indicated by the mark "o" in FIG. 3 is formed by driving two image sensors of a still video camera arranged as shown in FIG. 11 in synchronism with a clock signal of a frequency 3 fsc (fsc: a subcarrier frequency). Further, a pilot signal is frequency-multiplexed as shown in FIG. 5 with the image signal to obtain a recording signal. The recording signal thus obtained is recorded in four tracks on the video floppy disc as shown in FIG. 4. The pilot signal is of a single frequency 168 fH and is phase-locked to the above-stated clock signal of the frequency 3 fsc.

A thin-film two-channel head 312 consists of a head 312A which is for a channel #1 and a head 312B which is for a channel #2. The reproducing arrangement includes a spindle motor 314; a head driving mechanism 316; reproduction amplifiers 318 and 319 which are in combination with the heads 312A and 312B; an equalizer 320 which has a variable equalizing characteristic; a reproduced signal processing circuit 322 which consists of a demodulation circuit, a deemphasis circuit, etc.; a BPF 324 which is arranged to separate the pilot signal fT; an amplifying circuit 326; an AGC circuit 328 which is arranged to keep the amplitude level of the reproduced pilot signal fT at a given level; a multiplication circuit 330; a voltage controlled oscillation circuit (VCO) 332 which is arranged to generate a signal of a frequency near to 168 fH; an LPF 334 which is arranged to take out a signal indicating a frequency difference between the output of the VCO 332 and the reproduced pilot signal; and a loop filter 336 which has two different loop bands arranged to be selectable as will be described in detail later herein. A signal 337 having its frequency at 168 fH which is phase-locked to the reproduced pilot signal is generated by the above-stated circuits 330, 332, 334 and 336.

A sync signal separation circuit 338 is arranged to separate sync signals from a demodulated image signal. A frequency dividing circuit 340 is arranged to be reset by a horizontal sync signal separated by the sync signal separation circuit 338 and to frequency-divide the signal 337 into ⅛. A reference numeral 342 denotes a phase comparison circuit. A numeral 344 denotes another loop filter having a loop band which is equal to or higher than the loop band of the above-stated loop filter 336. A voltage controlled oscillation circuit (VCO) 346 is arranged to generate a signal of a frequency which is near to the frequency of 6 fsc (1365 fH). A numeral 348 denotes a 1/65 frequency dividing circuit. A phase-locked loop circuit is thus formed jointly by these circuit elements 342, 344, 346 and 348. A memory writing clock signal (6 fsc) is formed by the phase-locked loop circuit.

A phase shifting circuit 350 is arranged to adjust a sampling clock signal to the sampled point of the image signal. A transmission path equalizer 352 is provided for the purpose of adjusting the amplitude and phase characteristics of the demodulated image signal. The reproducing arrangement further includes a memory control circuit 354, an A/D converter 356; an image memory 358; a D/A converter 360; a reading clock signal generating circuit 362; an image output terminal 364; an interpolation processing circuit 366; a reproduction channel change-over switch 368 which is provided for change-over between the reproduction channels of the head 312; and a control circuit 372 which is arranged to change the characteristics of the equalizer 320 and the loop filter 336.

The reproducing operation of the arrangement shown in FIG. 16 is described as follows: In response to an instruction given from a system controller which is not shown, the head driving mechanism 316 shifts the positions of the heads 312A and 312B relative to the tracks formed on the video floppy disc 310. When these heads are abutting on the tracks B and C shown in FIG. 4, a frame image signal is obtained with the same degree of resolution as the conventional reproducing apparatus. In this instance, the operation is as follows: The outputs of the heads 312A and 312B are amplified respectively by the reproduction amplifiers 318 and 319. The outputs of the amplifiers 318 and 319 are alternately allowed to pass through the switch 368 every 1/30 sec. The output of the switch 368 is applied to the equalizer 320 as a reproduced frame image signal. The equalizer 320 is arranged to change its equalizing characteristic from one characteristic over to another under the control of the control circuit 372 according to whether the heads 312A and 312B are abutting on the 36th track and tracks subsequent to the 36th track or are abutting on the 35th track and tracks preceding the 35th track. The balance between the upper side-band and lower side-band of the reproduced frequency-modulated signal is adjusted by the equalizer 320. In reproducing signals from the inner-side tracks of the video floppy disc 310 where the upper side-band of the reproduced frequency-modulated signal deteriorates to a greater degree, this arrangement effectively prevents the reproduced signal from being inverted. The frame image signal thus processed by the equalizer 320 is then supplied to the reproduced signal processing circuit 322 to be subjected to various processes including a demodulation process, a deemphasis process, etc. Then, with the connecting position of the switch 370 shifted to one side "b" thereof, the frame image signal thus processed by the circuit 322 is output from the output terminal 364. The frame image signal thus output has the same degree of resolution as an image signal obtained by the conventional reproducing apparatus.

In reproducing a high quality image signal by taking into the image memory 358 a four-field amount of an image signal and by carrying out interpolation between picture elements, the fourth embodiment performs a reproducing operation in the following manner:

In accordance with an instruction received from the system controller which is not shown, the head driving mechanism 316 shifts the position of the head 312A to the track A shown in FIG. 4. A one-field amount of image signal recorded in the track A is reproduced by the head 312A. The reproduced signal is applied to the equalizer 320 and the BPF 324 through the reproduction amplifier 318 and the switch 368. The equalizer 320 and the reproduced signal processing circuit 322 then perform the same processing actions as those mentioned in the foregoing. The sync signal is separated by the sync signal separation circuit 338. The horizontal sync signal obtained by the sync signal separation circuit 338 is applied to the memory control circuit 354 to be used as a horizontal reset pulse in writing into the memory.

Meanwhile a pilot signal is separated from the reproduced signal by the BPF 324 which has the center frequency of its passing frequency band at 168 fH, i.e., 2.63 MHz. The pilot signal thus separated is amplified up to a suitable level by the amplifying circuit 326. After that, the pilot signal is applied to the AGC circuit 328 to be kept at a given amplitude level. The multiplication circuit 330 performs a multiplying operation on the output of the VCO 332 and that of the AGC circuit 328. The LPF 334 extracts a signal component corresponding to a phase difference between the two inputs of the multiplication circuit 330. The output of the LPF 334 is supplied to the loop filter 336. The LPF 334 converts the output of the LPF 334 into an error voltage. The error voltage is supplied to the VCO 332.

The details of the arrangement of the loop filter 336 of the fourth embodiment are as follows: The loop filter 336 is a complete integrating secondary loop filter. With the parallel resistance value of resistors R3 and R4 assumed to be Rs, the cut-off frequency $\omega c$ of the loop filter 336 can be expressed as follows:

$$\omega c = 1/\tau_2 = 1/C\,Rs \tag{1}$$

For example, the cut-off frequency $\omega c$ is set at 1 KHz for the outer-side tracks (from the first to 35th tracks) of the video floppy disc which give a better S/N ratio and at 500 Hz for the inner-side tracks (from the 36th to 50th tracks) which give a poorer S/N ratio. Further, the resistance values of the resistors R3 and R4 are arranged to be equal to each other. A switch S3 is turned on for the outer-side tracks and turned off for the inner-side tracks in accordance with an equalizer change-over control pulse signal P which is output from the control circuit 372. Assuming that damping factor $\xi$ of the loop filter system is set at $\frac{1}{2}$, the loop band $\omega k$ becomes as expressed below due to this change-over:

$$\omega k = 4 \xi^2 \omega c \qquad (2)$$

Therefore, the loop band becomes 2 KHz for the outer-side tracks and 1 KHz for the inner-side tracks.

With the gain constant of the multiplication circuit 330 assumed to be Kp (V/rad) and the gain constant of the VCO 332 to be Kv (rad/V sec), the loop band $\omega k$ can be expressed as follows:

$$\omega K = K p \cdot K v \cdot \tau_2 \tau_1 \qquad (3)$$

With the parallel resistance value of the resistors R1 and R2 assumed to be $R_T$, there obtains the following relation:

$$\tau_1 = C R_T \qquad (4)$$

In order to reduce the value $\tau_1$ to $\frac{1}{4}$ thereof when the cut-off frequency is increased by two times, the parallel resistors R1 and R2 are set in the following relation:

$$R1 = (\tfrac{1}{3})R2 \qquad (5)$$

Then, a switch S2 is controlled to be turned on for the outer-side tracks and off for the inner-side tracks.

Any phase error variations that result from the S/N ratio of the pilot signal can be prevented by the above-stated arrangement which narrows the loop band only when the heads are at the inner-side tracks which give a poorer S/N ratio of the reproduced pilot signal.

The signal 337 output from the VCO 332 is thus phase-locked to the reproduced pilot signal in the manner as described above. The signal 337 is then frequency-divided into $\frac{1}{8}$ by the frequency dividing circuit 340 before it is applied to the phase comparison circuit 342. Meanwhile, to the other input terminal of the phase comparison circuit 342 is applied a signal (21 fH) which is obtained from the frequency dividing circuit 348 by frequency-dividing the output of the VCO 346 into 1/65. Then phase comparison circuit 342 then produces a phase-difference signal. The phase-difference signal is converted into an error voltage by the loop filter 344. The error voltage is applied to the control terminal of the VCO 346. This causes the VCO 346 to produce the clock pulse signal of frequency 6 fsc which is phase-locked to the above-stated signal 337. This clock pulse signal is supplied to the phase shifting circuit 350 to have its phase adjusted before it is supplied to the memory control circuit 354 and the A/D converter 356.

Meanwhile, the reproduced image signal which has its amplitude and phase characteristics corrected by the transmission path equalizer 352 is supplied to the A/D converter 356 to be digitized in synchronism with the clock pulse signal coming from the VCO 346 via the phase shifting circuit 350. The digital image signal thus obtained is written into the image memory 358 at writing addresses designated by the memory control circuit 354 in synchronism with clock pulse signal.

The one-field amount of the reproduced image signal obtained from the track A of the video floppy disc 310 is thus stored in the image memory 358 in the manner as described above. Following this, an image signal which is reproduced from the track B of the video floppy disc 310 by the other head 312B is likewise processed and stored also in the image memory 358. After that, the heads 312A and 312B are radially shifted on the video floppy disc 310 by the head driving mechanism 316 to an extent corresponding to two tracks. Then the image signal record is reproduced from tracks C and D and is stored in the image memory 358. A total of four-field amount of image signal is thus stored in the image memory 358. The stored image signal which corresponds to the picture elements indicated by the mark "o" in FIG. 14 is read out from the image memory 358. The image signal thus read out is used to form an interpolation image signal for picture elements indicated by the mark "X" in FIG. 14. The interpolation image signal thus formed is stored also in the image memory 358. With the interpolation image signal having been stored in the image memory 358 together with the reproduced image signal in this manner, the memory control circuit 354 designates reading addresses of the image memory 358 in synchronism with a high-quality image signal reading clock signal output from the reading clock signal generating circuit 362. Then, the image signal stored in the image memory 358 is read out from the reading address thus designated. The image signal read out is supplied to the D/A converter 360 to be converted into an analog signal form in synchronism with the above-stated reading clock signal. The analog image signal thus obtained is supplied to the terminal "a" of the switch 370. Then, with the connecting position of the switch 370 shifted to the terminal "a", an image signal of high quality is output from the output terminal 364.

Figure 17:
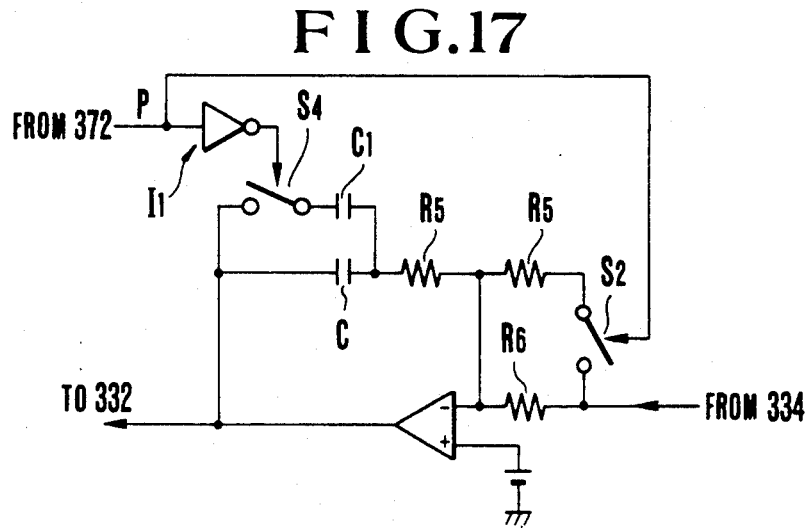
FIG. 17 shows another example of arrangement of a loop filter shown in FIG. 16.

While the time constants $\tau_1$ and $\tau_2$ are arranged to be changed through the resistance value in the case of the fourth embodiment shown in FIG. 16, this arrangement may be changed to arrange the value of a capacitor to be variable as shown in FIG. 17. Referring to FIG. 17, a capacitor C1 is arranged to be equal to another capacitor C. A resistor R5 is arranged to be equal to another resistor R6. The connecting position of a switch S4 is controlled by a signal obtained by inverting through an inverter I1 the control signal P of the control circuit 372 which is shown in FIG. 16. The switch S4 is turned off and another switch S2 turned on when the heads are at the outer-side tracks on the video floppy disc. The switch S4 is turned on and the switch S2 turned off when the heads are at the inner-side tracks on the video floppy disc.

The fourth embodiment permits simplification of the circuit arrangement thereof, because: The characteristic of the loop filter 336 is arranged to be changed from one characteristic over to another by utilizing the control signal which is used for change-over of the characteristic of the equalizer 320.

In the case of the embodiment shown in FIGS. 16 and 17, the loop band of the loop filter is set at two different values which are arranged in two steps. However the loop band may be set at more than two stepwise values according to the S/N ratio of the reproduced pilot signal. Further, the setting values of the loop filter are not limited to the values mentioned by way of example in the foregoing description.

As described in the foregoing, the loop band of the PLL circuit which forms the clock signal from the reproduced pilot signal for writing into the image memory is arranged to be narrower in case that the reproduced pilot signal has a poor S/N ratio. This arrangement enables the fourth embodiment to be capable of sufficiently suppressing phase error variations even when the reproduced pilot signal has a poor S/N ratio. Further, the arrangement to have the loop band of the PLL circuit narrowed in reproducing signals from the inner-side record tracks enables the embodiment to correct time-base variations with a sufficiently quick responsivity in reproducing signals from the outer-side tracks which give jitters in a relatively large amount. Therefore, the embodiment is capable of stably correcting time-base variations for the signals reproduced from all the tracks on the video floppy disc.

What is claimed is:

1. An image signal recording apparatus for recording on a recording medium an image signal which is composed of a chrominance signal and a luminance signal including a synchronizing signal, comprising:
   a) first modulation means for modulating said luminance signal into a first frequency band;
   b) second modulation means for modulating said chrominance signal into a second frequency band which is lower than said first frequency band;
   c) pilot signal generating means for generating a pilot signal which is of a frequency between said first and second frequency bands, said pilot signal generating means including phase-locked loop means having said synchronizing signal as an input thereto and providing said pilot signal in phase-locked relation with
   d) frequency multiplex signal forming means for forming a frequency multiplex signal by frequency-multiplexing said luminance signal modulated by said first modulation means, said chrominance signal modulated by said second modulation means and said pilot signal generated by said pilot signal generating means; and
   e) recording means for recording said frequency multiplex signal on said recording medium.

2. An apparatus according to claim 1, wherein said first modulation means includes a frequency modulation circuit arranged to frequency-modulate said luminance signal.

3. An apparatus according to claim 1, wherein said chrominance signal includes a color-difference line-sequential signal.

4. An apparatus according to claim 3, wherein said second modulation means includes a frequency modulation circuit arranged to frequency-modulate said color-difference line-sequential signal.

5. An apparatus according to claim 1, wherein said pilot signal generating means is arranged to generate a pilot signal having a signal frequency between 2.5 MHz and 3.5 MHz.

6. An apparatus according to claim 1, wherein said frequency multiplex signal forming means is arranged to form said frequency multiplex signal so that said pilot signal generated by said pilot signal generating means is frequency-multiplexed at a current level of $-15$ dB or less relative to the current level of frequency-multiplexing of said chrominance signal modulated by said second modulation means.

7. An image signal recording apparatus for recording an image signal input thereto in recording position on a disc-shaped recording medium, comprising:
   a) reference pilot signal generating means for generating a reference pilot signal having a characteristic suited for use in a time-base variation correcting process performed during a reproducing operation;
   b) level adjusting means receiving said reference pilot signal for adjusting a level of said reference pilot signal correspondingly with said recording positions on said disc-shaped recording medium of said reference pilot signal;
   c) frequency multiplex signal forming means for receiving said image signal and the level-adjusted reference pilot signal and forming a frequency multiplex signal by frequency-multiplexing said image signal and said reference pilot signal; and
   d) recording means for recording said frequency multiplex signal on said disc-shaped recording medium.

8. An apparatus according to claim 7, wherein said image signal is composed of a frequency-modulated luminance signal having a first frequency band and a frequency-modulated chrominance signal having a second frequency band which is lower than said first frequency band.

9. An apparatus according to claim 8, wherein said reference pilot signal generating means is arranged to generate a reference pilot signal having a frequency between said first and second frequency bands.

10. An apparatus according to claim 7, wherein said level adjusting means is arranged to adjust the level of said reference pilot signal in such a way as to have said reference pilot signal recorded at a lower level in an inner side area of said disc-shaped recording medium than in an outer side area of said disc-shaped recording medium.

11. An image signal reproducing apparatus for reproducing an image signal from a disc-shaped recording medium on which a time-base variation correcting pilot signal frequency-multiplexed with said image signal is recorded in a plurality of positions on said recording medium, comprising:
   a) reproducing means for reproducing from said disc-shaped recording medium said image signal and said pilot signal;
   b) a phase-locked loop circuit having said pilot signal as an input thereto and providing a clock signal which is phase-locked to said pilot signal, said phase-locked loop circuit including means for varying a loop band characteristic thereof in accordance with said recording positions on said disc-shaped recording medium in which said pilot signal to be reproduced by said reproducing means is recorded; and
   c) storing means for storing, in synchronism with said clock signal formed by said phase-locked loop circuit, said image signal reproduced by said reproducing means.

12. An apparatus according to claim 11, wherein said phase-locked loop circuit is arranged to have a narrower loop band characteristic when said pilot signal reproduced by said reproducing means is recorded in an area located on the inner side of said disc-shaped recording medium than when said pilot signal reproduced is recorded in an area located on the outer side of said disc-shaped recording medium.

* * * * *

UNITED STATES PATENT AND TRADEMARK OFFICE
CERTIFICATE OF CORRECTION

PATENT NO. : 5,142,376
DATED : August 25, 1992
INVENTOR(S) : Tokihiko Ogura

It is certified that error appears in the above-indentified patent and that said Letters Patent is hereby corrected as shown below:

Abstract, lines 15-16, "occurred" should read --occurring--.

Column 12, line 21, "occurred" should read --occurring--.

Col. 14, line 16.  Change "occurred" to -- occurring --

Col. 14, line 48.  Change "moir" to -- moire --

Col. 23, line 21.  After "with" insert -- said synchronizing signal; --

Col. 23, line 56.  Change "position" to -- positions --

Signed and Sealed this

Thirtieth Day of November, 1993

Attest:

BRUCE LEHMAN

Attesting Officer

Commissioner of Patents and Trademarks